US012561007B2

(12) United States Patent
Lee et al.

(10) Patent No.: US 12,561,007 B2
(45) Date of Patent: Feb. 24, 2026

(54) METHOD AND ELECTRONIC DEVICE FOR PROVIDING USER INTERFACE ON AN EXPANDABLE FLEXIBLE DISPLAY

(71) Applicant: SAMSUNG ELECTRONICS CO., LTD., Suwon-si (KR)

(72) Inventors: Subeom Lee, Suwon-si (KR); Hankon Kim, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 88 days.

(21) Appl. No.: 18/306,533

(22) Filed: Apr. 25, 2023

(65) Prior Publication Data

US 2023/0259217 A1 Aug. 17, 2023

Related U.S. Application Data

(63) Continuation of application No. PCT/KR2022/011359, filed on Aug. 2, 2022.

(30) Foreign Application Priority Data

Sep. 27, 2021 (KR) ........................ 10-2021-0127288

(51) Int. Cl.
*H04M 1/02* (2006.01)
*G06F 1/16* (2006.01)
(Continued)

(52) U.S. Cl.
CPC ............ *G06F 3/017* (2013.01); *G06F 1/1624* (2013.01); *G06F 3/04886* (2013.01);
(Continued)

(58) Field of Classification Search
CPC ............................ G06F 3/04886; G06F 3/0488
See application file for complete search history.

(56) References Cited

U.S. PATENT DOCUMENTS 9,223,348 B2 * 12/2015 Cho ..................... H04M 1/0268
9,485,341 B2 * 11/2016 Park ...................... H04M 1/724
(Continued)

FOREIGN PATENT DOCUMENTS

KR      2014-0025231 A      3/2014
KR         101559091 B1     10/2015
(Continued)

OTHER PUBLICATIONS

Extended European Search Report dated Jul. 25, 2024 for EP Application No. 22873095.8.
(Continued)

*Primary Examiner* — Benjamin Smith
(74) *Attorney, Agent, or Firm* — Nixon & Vanderhye P.C.

(57) ABSTRACT

An electronic device may include a housing, a display configured to be received inside the housing, at least one processor operatively connected to the display, and a memory operatively coupled to the at least one processor, wherein the memory may store instructions that, when executed, cause the at least one processor, if the display is detected to be expanded from the housing while providing a first screen, to identify a user's grip state, to determine a first area in which the first screen is displayed when the display is expanded based on the identified grip state, to identify whether or not the determined first area corresponds to a drawing-out direction of the display, and if the first area corresponds to the drawing-out direction of the display, to display a second screen, which is separated from the first screen, on a display area drawn out of the housing. In addition, various embodiments recognized through this document are possible.

20 Claims, 29 Drawing Sheets

(51) Int. Cl.
| | |
|---|---|
| *G06F 3/01* | (2006.01) |
| *G06F 3/04886* | (2022.01) |
| *G06F 3/14* | (2006.01) |

(52) U.S. Cl.
CPC .......... *G06F 3/1423* (2013.01); *G06F 3/1431* (2013.01); *H04M 1/0237* (2013.01)

(56) References Cited

U.S. PATENT DOCUMENTS

| | | | | |
|---|---|---|---|---|
| 9,609,225 | B2 * | 3/2017 | Kwon | G06F 3/04845 |
| 9,671,911 | B2 * | 6/2017 | Yang | G06F 3/04186 |
| 9,785,272 | B1 * | 10/2017 | Rosenberg | G06F 3/041661 |
| 9,891,662 | B2 * | 2/2018 | Cho | G06F 1/1647 |
| 9,891,663 | B2 * | 2/2018 | Park | G06F 1/1677 |
| 9,891,820 | B2 * | 2/2018 | Luo | G06F 3/041 |
| 10,001,809 | B2 * | 6/2018 | Seo | G09F 27/005 |
| 10,007,328 | B2 | 6/2018 | Lee et al. | |
| 10,424,272 | B2 * | 9/2019 | Yoon | G09G 5/14 |
| 10,474,302 | B2 * | 11/2019 | Takashima | G06F 3/04166 |
| 10,534,453 | B2 | 1/2020 | Kwon et al. | |
| 11,106,358 | B2 * | 8/2021 | Yoon | G06F 1/1694 |
| 11,147,026 | B2 | 10/2021 | Lee et al. | |
| 11,189,251 | B2 * | 11/2021 | Shim | G06F 3/04144 |
| 11,252,826 | B2 * | 2/2022 | Park | G06F 3/04886 |
| 11,449,216 | B2 * | 9/2022 | Rho | G06F 3/04886 |
| 11,815,958 | B2 * | 11/2023 | Ahn | G06F 1/1652 |
| 11,835,986 | B2 * | 12/2023 | Kim | G06F 3/04842 |
| 11,907,494 | B2 * | 2/2024 | Kim | H04M 1/0235 |
| 11,908,363 | B2 * | 2/2024 | Li | G06F 1/1652 |
| 11,996,021 | B2 * | 5/2024 | Cheon | G06F 3/1454 |
| 12,019,473 | B2 * | 6/2024 | Gudivada | G06F 1/3218 |
| 12,210,376 | B2 * | 1/2025 | Zhang | G06F 1/1686 |
| 12,284,301 | B2 * | 4/2025 | Koh | G06F 3/04883 |
| 2010/0167791 | A1 * | 7/2010 | Lim | G06F 1/1624 |
| | | | | 455/566 |
| 2014/0247229 | A1 * | 9/2014 | Cho | G06F 1/1652 |
| | | | | 345/173 |
| 2014/0337786 | A1 * | 11/2014 | Luo | G06F 3/0425 |
| | | | | 715/773 |
| 2015/0220119 | A1 * | 8/2015 | Seo | G09G 5/37 |
| | | | | 345/173 |
| 2015/0227225 | A1 * | 8/2015 | Park | G06F 1/1652 |
| | | | | 345/173 |
| 2015/0338954 | A1 * | 11/2015 | Yang | G06F 3/04186 |
| | | | | 345/174 |
| 2016/0062515 | A1 * | 3/2016 | Bae | G06F 3/044 |
| | | | | 345/174 |
| 2016/0124497 | A1 | 5/2016 | Lee et al. | |
| 2016/0191690 | A1 * | 6/2016 | Park | H04M 1/0268 |
| | | | | 455/566 |
| 2016/0349971 | A1 * | 12/2016 | Chi | G09G 5/373 |
| 2016/0373654 | A1 * | 12/2016 | Kwon | G09G 5/373 |

| | | | | |
|---|---|---|---|---|
| 2016/0378270 | A1 * | 12/2016 | Lee | G06F 1/1647 |
| | | | | 715/788 |
| 2017/0011714 | A1 * | 1/2017 | Eim | G06F 1/1677 |
| 2017/0147189 | A1 * | 5/2017 | Ryu | G06F 3/04886 |
| 2017/0154609 | A1 * | 6/2017 | Yoon | G09G 5/373 |
| 2017/0212607 | A1 | 7/2017 | Yoon | |
| 2018/0101263 | A1 * | 4/2018 | Takashima | G06F 3/04186 |
| 2018/0342225 | A1 * | 11/2018 | Yun | H04N 21/431 |
| 2018/0348881 | A1 | 12/2018 | Chung | |
| 2018/0364827 | A1 * | 12/2018 | Chung | G06F 1/1677 |
| 2018/0374452 | A1 * | 12/2018 | Choi | G06F 3/04886 |
| 2019/0261519 | A1 * | 8/2019 | Park | G06F 1/1677 |
| 2019/0346954 | A1 * | 11/2019 | Jung | G06F 3/0416 |
| 2020/0201501 | A1 * | 6/2020 | Rho | G06F 3/016 |
| 2020/0225848 | A1 | 7/2020 | Yoon et al. | |
| 2021/0072796 | A1 | 3/2021 | Kim et al. | |
| 2021/0295803 | A1 * | 9/2021 | Shim | G06F 1/1652 |
| 2022/0291723 | A1 * | 9/2022 | Otomasu | G06F 3/0481 |
| 2022/0329687 | A1 * | 10/2022 | Kim | H04M 1/0268 |
| 2022/0360654 | A1 * | 11/2022 | Xiong | H04M 1/72436 |
| 2022/0368784 | A1 * | 11/2022 | Koh | H04M 1/0235 |
| 2023/0016622 | A1 * | 1/2023 | Gudivada | G06F 1/1624 |
| 2023/0044497 | A1 * | 2/2023 | Zhang | G06F 1/1686 |
| 2023/0076158 | A1 * | 3/2023 | Li | G06F 1/1652 |
| 2023/0152966 | A1 * | 5/2023 | Kim | G06F 1/1677 |
| | | | | 345/173 |
| 2023/0222959 | A1 * | 7/2023 | Kim | G06F 3/0484 |
| | | | | 345/428 |
| 2023/0224401 | A1 * | 7/2023 | Ok | G06F 3/041 |
| | | | | 455/575.4 |
| 2023/0245607 | A1 * | 8/2023 | Cheon | G06F 3/1446 |
| | | | | 345/173 |
| 2023/0305670 | A1 * | 9/2023 | Kim | G06F 1/1652 |
| 2024/0312380 | A1 * | 9/2024 | Cheon | G06F 3/1423 |

FOREIGN PATENT DOCUMENTS

| | | | |
|---|---|---|---|
| KR | 20160050682 | A | 5/2016 |
| KR | 20160080254 | A | 7/2016 |
| KR | 20170011675 | A | 2/2017 |
| KR | 20170089664 | A | 8/2017 |
| KR | 101892959 | B1 | 8/2018 |
| KR | 20200075809 | A | 6/2020 |
| KR | 102148682 | B1 | 8/2020 |
| KR | 20200120134 | A | 10/2020 |
| KR | 20200123394 | A | 10/2020 |
| KR | 102206948 | B1 | 1/2021 |
| WO | WO 2021/033221 | A1 | 2/2021 |
| WO | 2021045275 | A1 | 3/2021 |

OTHER PUBLICATIONS

Korean Office Action dated Oct. 17, 2025 for KR Application No. 10-2021-0127288.

* cited by examiner

METHOD AND ELECTRONIC DEVICE FOR PROVIDING USER INTERFACE ON AN EXPANDABLE FLEXIBLE DISPLAY

CROSS-REFERENCE TO RELATED APPLICATIONS

This application is a continuation of International Application No. PCT/KR2022/011359, designating the United States, filed on Aug. 2, 2022, in the Korean Intellectual Property Receiving Office and claiming priority to KR Patent Application No. 10-2021-0127288, filed on Sep. 27, 2021, the disclosures of which are incorporated by reference herein in their entireties.

FIELD

Background

Various example embodiments disclosed in this document relate to a method for providing a user interface in an electronic device including a flexible display and a device therefor.

Description of Related Art

Recently, the use of a flexible type electronic device capable of changing the physical shape of a display area has proliferated. For example, a foldable type, rollable type, or slidable type electronic device may adopt a structure in which the display area is able to be expanded or reduced, thereby providing a wide screen by extending the size of the display area as needed while maintaining portability.

In general, the flexible type electronic device may configure a user interface provided after the display area is expanded to be different from a user interface provided before the display area is expanded. For example, the electronic device in which the display area is expanded may produce a user interface to increase the size of the content that the user was watching and provide the same or to provide a multi-window function through screen division of the expanded display.

If the flexible type electronic device expands the display area of a display only in a specified manner without consideration for a use environment or a grip state, a limited user experience may be provided. For example, if an event occurs while the user is watching content, information related to the event may be provided to be superimposed on the content currently being viewed, which may act as an obstacle to the content being viewed.

SUMMARY

Accordingly, various example embodiments may provide a user interface based on a user's grip state (e.g., a grip position or a screen direction) when the display area of a display of an electronic device including a flexible display is expanded.

The technical problems to be solved in the example embodiments are not limited to the technical problems mentioned above, and other technical problems that are not mentioned may be clearly understood by those of ordinary skill in the art to which the disclosure belongs from the description below.

An electronic device according to an example embodiment may include a housing, a display configured to be received inside the housing, at least one processor (including processing circuitry) operatively connected to the display, and a memory operatively coupled to the at least one processor, wherein the memory may store instructions that, when executed, cause the at least one processor, based on the display detected to be expanded from the housing while providing a first screen, to identify a user's grip state, to determine a first area in which the first screen is displayed when the display is expanded based on the identified grip state, to identify whether or not the determined first area corresponds to a drawing-out direction of the display, and based on the first area corresponding to the drawing-out direction of the display, to display a second screen, which is separated from the first screen, on a display area drawn out of the housing.

A method of operating an electronic device according to an example embodiment may include, if a display is detected to be expanded from a housing while providing a first screen, identifying a user's grip state, determining a first area in which the first screen is displayed when the display is expanded based on the identified grip state, identifying whether or not the determined first area corresponds to a drawing-out direction of the display, and if the first area corresponds to the drawing-out direction of the display, displaying a second screen, which is separated from the first screen, on a display area drawn out of the housing.

According to various example embodiments, it is possible to provide a user interface supporting a multi-window function, based on a user's grip state (e.g., a grip position or a screen direction) when the display area of a display of an electronic device including a flexible display is expanded. In addition, even if an event occurs while watching content, event-related information may be further displayed on the display area of the expanded display, thereby providing various experiences to the user without interfering with the content currently being viewed.

In addition, various effects directly or indirectly identified from this document may be provided.

BRIEF DESCRIPTION OF THE DRAWINGS

The above and other aspects, features and advantages of certain an example embodiment will be more apparent from the following detailed description, taken in conjunction with the accompanying drawings, in which.

In connection with the description of the drawings, the same or similar reference numerals may be used for the same or similar elements.

DETAILED DESCRIPTION

Hereinafter, various embodiments will be described with reference to the accompanying drawings. This is not intended to limit the various embodiments of the disclosure to a specific form and should be understood to include various modifications, equivalents, and/or alternatives of the disclosure.

Figure 1:
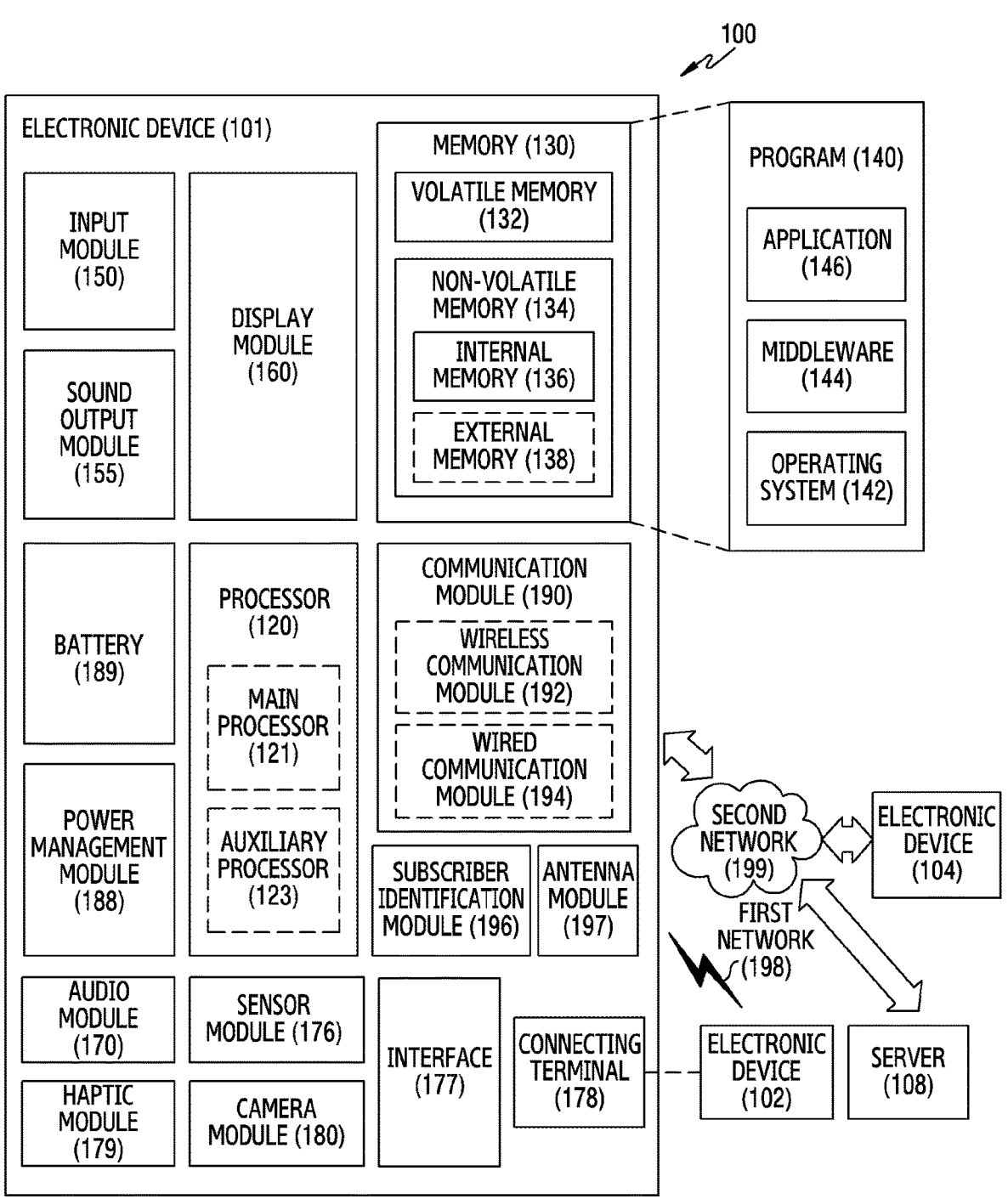
FIG. 1 is a block diagram of an electronic device in a network environment according to an example embodiment.

FIG. 1 is a block diagram illustrating an electronic device 101 in a network environment 100 according to various example embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
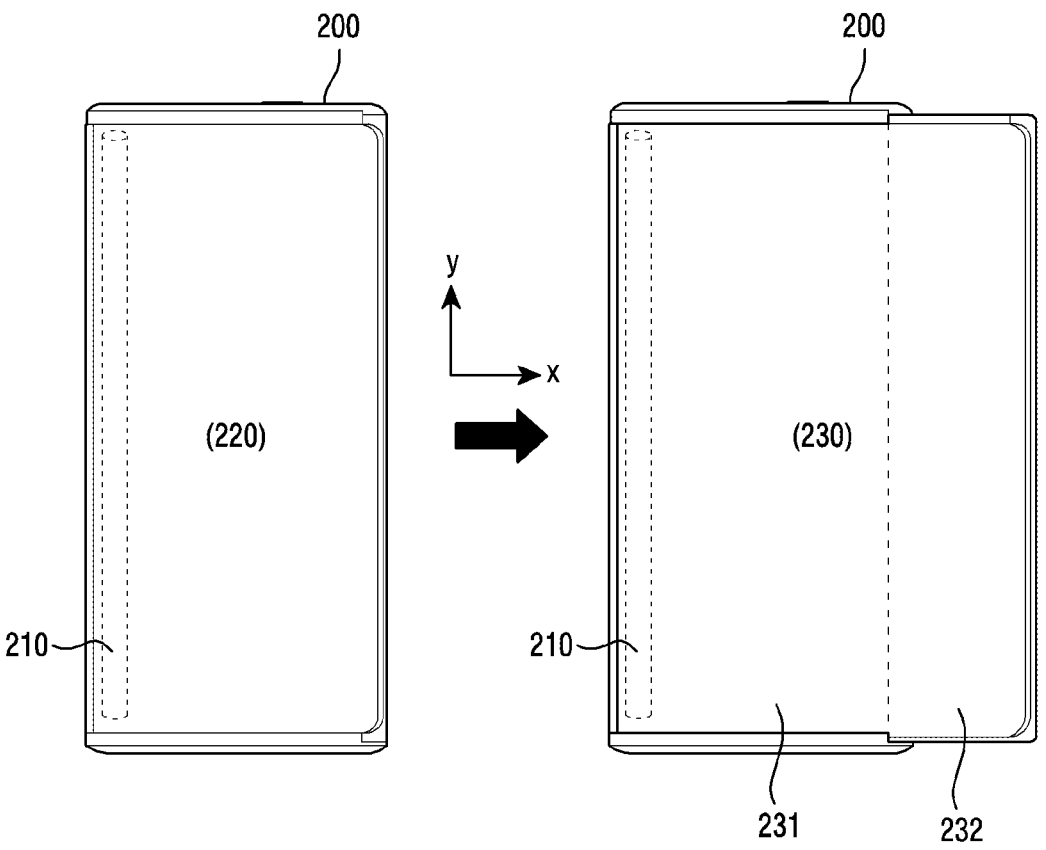
FIG. 2 is a diagram illustrating a display area provided depending on the expansion state of a display area of a display according to an embodiment.

FIG. 2 is a diagram illustrating a display area provided depending on the expansion state of a display area of a display according to an embodiment.

Referring to FIG. 2, an electronic device 200 may be an electronic device including a flexible display in which the shape of the display is variable, and include a roller 210 and a display 220. According to various embodiments, the roller 210 may be implemented in a cylindrical shape to roll or unroll the display 220, and may be disposed inside a housing of the electronic device 200.

In an embodiment, the display 220 that is a flexible display in which the size of the display area of the display exposed to the outside (or visible to the front of the electronic device) is variable (e.g., increased or reduced) may be a rollable display or a slidable display. The size of the display area of the display may be variable depending on the deformation state (e.g., a rolling state, a sliding state, an expanded state, a reduced state, a maximum or large expanded state, a maximum reduced state, or an intermediate state) of the display 220. For example, the display 220 may be expanded or reduced depending on a user input (e.g., a roll-in/roll-out input according to a rolling operation or a slide-in/slide-out input according to a sliding operation). As another example, the display 220 may be automatically, semi-automatically, or manually expanded or reduced according to occurrence of a specified event.

In an embodiment, the display 220 may be rolled or unrolled by the roller 210 in at least one direction (e.g., the x-axis direction (horizontal direction) or the y-axis direction (vertical direction)). For example, if the display 220 is rolled by the roller 210, at least a portion of the display 220 may be received in the housing so that the display area may be exposed to the outside. If the display 220 is unrolled in the x-axis direction by the roller 210, at least a portion of the display area received inside the housing may be drawn out so that the horizontal size (x-axis direction length) of the display area exposed to the outside may be increased. If the display 220 is unrolled in the y-axis direction by the roller 210, at least a portion of the display area received inside the housing may be drawn out so that the vertical size (y-axis direction length) of the display area exposed to the outside may be increased.

In an embodiment, the expanded display 230 may be divided into a first area 231 that is always exposed to the outside, regardless of deformation of the display, and a second area 232 that is further exposed after expansion. The size of the first area 231 may correspond to the size of the display 220 in the state of being rolled by the roller 210. The size of the second area 232 may correspond to the size of the display area that is unrolled by the roller 210 to be drawn out. According to various embodiments, the electronic device 200 may provide content, which is different from that of the first area 231, through the second area 232. For example, the first area 231 may provide an execution screen of an application that was being executed and was being viewed by the user before expansion, and the second area 232 may provide information related to an event detected during the execution of the application or additional information related to the application.

According to various embodiments, the positions of the first area 231 and the second area 232 may be changed in the expanded display 230, based on a user's grip state, in order to minimize or reduce the inconvenience of the user due to the change of the user interface when the display 220 is expanded. For example, the electronic device 200 may identify the grip position according to the grip state and determine the positions of the first area 231 and the second area 232, based on the identified grip position. If it is identified that the user's grip position is on the left side of the display, the first area 231 may be determined based on the left side of the expanded display 230, and the second area 232 may be determined on the right side of the expanded display 230. As another example, the electronic device 200 may identify a screen direction according to the grip state and determine the positions of the first area 231 and the second area 232, based on the identified screen direction. If it is identified that the screen direction is the horizontal direction (e.g., the x-axis direction or the state the display is mounted in a landscape mode), the first area 231 may be determined based on the lower portion of the expanded display 230, and the second area 232 may be determined based on the upper portion of the expanded display 230.

Figure 3:
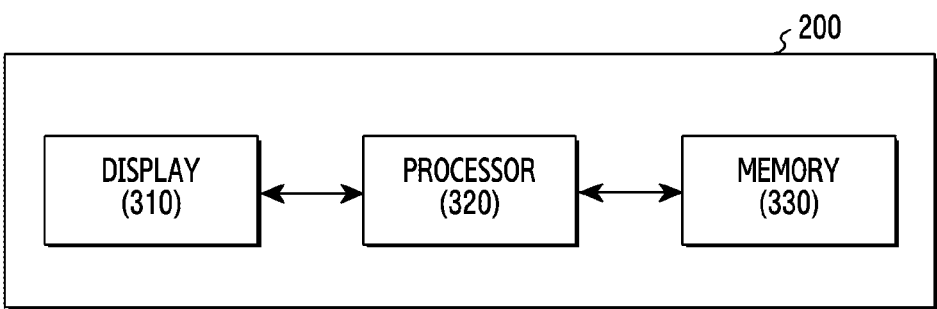
FIG. 3 is a block diagram illustrating the configuration of an electronic device according to an example embodiment.

FIG. 3 is a block diagram illustrating the configuration of an electronic device 200 according to an embodiment.

Referring to FIG. 3, an electronic device 200 that is a flexible type device in which the size of a display area exposed to the outside is variable may include a housing (not shown), a display 310, a processor 320, or a memory 330. In FIG. 3, the electronic device 200 may correspond to the electronic device 101 shown in FIG. 1 or the flexible type electronic device 200 shown in FIG. 2.

In an embodiment, the display 310 (e.g., the display module 160 of FIG. 1) is an output means in which the size of a display area exposed to the outside of the electronic device 200 is variable (e.g., increased or reduced) and may display different user interfaces depending on the deformation state. According to various embodiments, the size of the display area of the display 310 may vary (e.g., be expanded or reduced) according to a rolling operation or a sliding operation. For example, a partial area of the display 310, which is in the state of being received inside the housing (e.g., in a roll-in state or a slide-in state in which the partial area is inserted into the housing), may be drawn out of the housing by a rolling-out operation or a sliding-out operation, so that the size of the display area may be increased. If the partial area drawn out of the housing is inserted into the housing by a rolling-in operation or a sliding-in operation, the size of the display area may be reduced.

In an embodiment, the memory 330 (e.g., the memory 130 in FIG. 1) may store instructions that, when executed, cause at least one processor 320 (e.g., the processor 120 in FIG. 1) to perform various operations. For example, at least one processor 320 may perform operations of providing a multi-window function when the display 310 is expanded.

In an embodiment, the at least one processor 320 may detect that the display 310 expands from the housing while providing the first screen. For example, at least one processor 320 may detect whether the display 310 has been rolled or unrolled by the roller included in the housing to identify whether or not the display 310 has been expanded. If at least a partial area of the display 310, which is in the state of being received inside the housing, is unrolled by the roller included in the housing, at least one processor 320 may identify that the display 310 is expanded from the housing.

According to various embodiments, the first screen may include at least one of a plurality of pieces of content or an execution screen of an application that the user was watching before the display 310 is expanded. According to various embodiments, at least one processor 320 may control the roller such that the display 310 is automatically expanded when a specified event (e.g., phone notification, message reception, application-related notification reception, or user input) occurs or such that the display 310 is expanded by a specified operation performed by the user (e.g., a rolling-out operation or a sliding-out operation).

In an embodiment, at least one processor 320 may identify a user's grip state in response to detection of the expansion of the display 310. The grip state may include at least one of a screen direction exposed through the display 310 or a position of gripping the display by the user.

According to various embodiments, at least one processor 320 may identify whether the screen direction is a horizontal direction or a vertical direction. At least one processor 320 may detect the direction in which the electronic device 200 has been rotated by the user's grip. If it is identified that the screen direction is the horizontal direction (e.g., the x-axis direction or a landscape mode direction) according to the detection result, at least one processor 320 may determine that a lower portion of the display 310 is gripped in consideration of general user behavior patterns. If it is identified that the screen is in a vertical direction (e.g., the y-axis direction or a portrait mode direction) according to the detection result, at least one processor 320 may further identify the position gripped by the user.

According to various embodiments, at least one processor 320 may determine whether the position gripped by the user is in a left portion or right portion of the display 310. For example, at least one processor 320 may identify the grip position, based on a mainly used direction configured by the user. In the case where a one-handed manipulation mode is configured for the electronic device 200, at least one processor 320 may identify the grip position, based on the mainly used direction (or the hand that is mainly used) selected by the user. As another example, at least one processor 320 may identify the grip position using one or more sensors (e.g., the sensor module 176 in FIG. 1). At least one processor 320 may identify which side portion of the display 310 is gripped based on sensing data obtained from at least one of a grip sensor, a touch sensor, a pressure sensor, an acceleration sensor, or a gyro sensor provided in the electronic device 200. At least one processor 320 may identify the grip position based on an edge display area in which gripping of the user is detected. As another example, at least one processor 320 may identify the grip position using a wearable device (e.g., a smartwatch) worn on the user or an electronic pen being used by the user. In the case where at least one processor 320 recognizes whether the user wears the wearable device on the right or left wrist, the at least one processor 320 may identify whether a right or left hand grips the electronic device 200, based on at least one of a communication distance to the wearable device and sensing data obtained from a gyro sensor of the wearable device. When using an electronic pen, at least one processor 320 may identify the directions of the hand holding the electronic pen and the hand gripping the electronic device 200, based on at least one of an input direction or angle of an electronic pen or sensing data obtained from a gyro sensor inside the electronic pen, and determine the grip position, based on the identification result.

In an embodiment, at least one processor 320 may determine a first area on which the first screen is displayed based on the grip state identified above, when the display 310 is expanded. For example, if the screen direction identified based on the grip state is the horizontal direction (e.g., the x-axis direction or a landscape mode direction), at least one processor 320 may determine the first area, based on the lower area of the expanded display. As another example, if the screen direction is the vertical direction (e.g., the y-axis direction or a portrait mode direction), at least one processor 320 may further identify the user's grip position, based on the grip state, and determine the first area according to the identified grip position. If the grip position is identified to be in a left portion of the electronic device 200, at least one processor 320 may determine the first area, based on the left area of the expanded display. If the grip position is identified to be in a right portion of the electronic device 200, at least one processor 320 may determine the first area, based on the right area of the expanded display. According to various embodiments, the grip position may be determined according to the direction of a gripping hand of the user. At least one processor 320 may identify the direction of a gripping hand of the user, based on the mainly used direction (or the hand that is mainly used) configured by the user, sensing data obtained from one or more sensors, or external electronic devices (e.g., wearable devices or electronic pens), and determine the grip position according to the identification result.

In an embodiment, at least one processor 320 may identify that both the left portion and the right portion of the display 310 are gripped by the user when the screen direction is the vertical direction (e.g., the y-axis direction or a portrait mode direction). In this case, at least one processor 320 may determine the first area, based on one of the both portions where the grip is maintained for a long time. For example, if one hand is separated in the gripping state by both hands, at least one processor 320 may identify the portion where the grip lasts and determine the grip position. As another example, even if at least one processor 320 detects that the display 310 is expanded in the state of being gripped by one hand and that the display is further gripped by the other hand thereafter, at least one processor 320 may maintain the existing display state without changing the first area. If at least one processor 320 determines the first area, based on the left area of the expanded display, by identifying that the left portion of the electronic device 200 is gripped by the user and identifies that the right portion of the electronic device 200 is further gripped thereafter, the at least one processor 320 may give priority to the left-portion gripping state and maintain the determined direction of the first area as it is.

According to various embodiments, at least one processor 320 may determine the user's intention, based on sensing data obtained from one or more sensors when the user grips the electronic device 200. For example, at least one processor 320 may determine the grip position, based on the position where a relatively high gripping pressure is sensed in the gripping state by both hands or the position where the gripping pressure is applied in the direction of pulling the display 310. As another example, if it is identified that the gripping pressure detected by the one or more sensors exceeds a specified threshold level, at least one processor 320 may perform control such that the display 310 is not expanded even if the event occurs.

In an embodiment, at least one processor 320 may identify whether or not the determined first area corresponds to a drawing-out direction of the display 310. According to various embodiments, the drawing-out direction of the display 310 may be determined based on the position of the roller that rolls or unrolls at least portion of the display 310. At least one processor 320 may determine the drawing-out direction of the display 310 to be a direction opposite the direction in which the roller is positioned with respect to the display 310. For example, if the roller is position in the left portion of the display 310 (at least a portion of the display 310, which is in the state of being received in the left portion, is unrolled by the roller to be expanded), at least one processor 320 may identify that the display 310 is drawn out in the right direction. As another example, if the roller is positioned in the lower portion of the display 310 (at least a portion of the display 310 is received inside the lower portion and is then unrolled by the roller to be expanded), at least one processor 320 may identify that the display 310 is drawn out in the upper direction. According to various embodiments, at least one processor 320 may determine the drawing-out direction of the display 310 to correspond to a direction in which a user input for expanding the display 310 (e.g., a roll-out input according to a rolling operation or a slide-out input according to a sliding operation) is applied.

In an embodiment, if the first area corresponds to the drawing-out direction of the display 310 as a result of the identification, at least one processor 320 may display a second screen, which is separated from the first screen, on the display area that is drawn out of the housing. If the first area determined based on the user's grip state corresponds to the drawing-out direction of the display 310, the position of the first area is in a display area that is always exposed to the outside, so the first screen may be consistently displayed while maintaining an existing position. In this case, the second area to be further exposed as the display 310 is expanded may be determined to be positioned in the display area that is received inside the housing and then drawn out of the same. The size of the second area may correspond to the size of the display area drawn out of the housing. At least one processor 320 may display a second screen, which is different from the first screen, on the second area. According to various embodiments, the second screen may include information related to an event that occurs while providing the first screen. The event may include at least one of phone notification, message reception, application-related notification reception, or user input. If it is detected that the event occurs while providing the first screen in the state in which at least a portion of the display 310 is received inside the housing, at least one processor 320 may produce a second screen including information related to the event. At least one processor 320 may draw the display 310 out of the housing automatically in response to the occurrence of the event or based on a user input or operation detected after the occurrence of the event, and display the produced second screen on the second area.

In an embodiment, if the first area does not correspond to the drawing-out direction of the display 310 as a result of the identification, at least one processor 320 may move the first screen to the first area and display the first screen on the display area drawn out of the housing. In the case where the first area determined based on the user's grip state does not correspond to the drawing-out direction of the display 310, the position of the first area is in the display area that is received inside the housing and then drawn out of the same, so the first screen may be moved to the display area drawn out of the housing and then displayed thereon. At this time, at least one processor 320 may perform control such that the first screen is shifted to the first area in synchronization with a speed at which the display 310 is drawn out of the housing. In this case, the second area further exposed as the display 310 is expanded may be determined to be always positioned in the display area exposed to the outside. The size of the second area may correspond to the size of the display area drawn out of the housing.

According to various embodiments, at least one processor 320 may differently provide the second screen depending on the extent to which the display 310 is drawn out of the housing and expanded. For example, at least one processor 320 may not display anything to maintain a blank state on the second area while the display 310 is expanded, and may display the second screen on the second area in the expanded display after the display 310 is completely drawn out such that the second screen is exposed at once after the display 310 is completely drawn out. As another example, at least one processor 320 may gradually display the second screen to conform to the size of the second area while the display 310 is drawn out of the housing to be expanded. In this case, the second screen may be partially exposed, instead of being exposed at once, depending on the extent to which the display 310 is drawn out, and the entire second screen may be displayed on the second area after the display 310 is completely drawn out. As another example, at least one processor 320 may display the second screen in a manner of changing the size of the content included in the second screen according to the size of the second area while the display 310 is drawn out of the housing to be expanded. In this case, the content included in the second screen may be displayed in a simplified form or in a size reduced by a predetermined percentage depending on the extent to which the display 310 is drawn out, and the size of the content may be gradually expanded according to the size of the second area that is expanded by drawing out the display 310 and then displayed.

According to various embodiments, at least one processor 320 may divide the second area into a plurality of areas and then display one or more second screens thereon. For example, at least one processor 320 may produce one or more second screens in response to one or more events detected while providing the first screen and display the one or more second screens on the divided second areas. As another example, at least one processor 320 may display the one or more second screens at positions specified by the user. If a user input indicating display positions for the one or more second screens is detected after the display 310 is drawn out of the housing and expanded, at least one processor 320 may perform control such that the one or more second screens are displayed at the positions indicated by the user input.

According to various embodiments, at least one processor 320 may identify that the screen direction of the display 310 is changed while providing the first screen and the second screen through the expanded display. In this case, at least one processor 320 may rearrange the first screen and the second screen, based on the changed screen direction and the grip position after the screen changes, thereby providing the first screen and the second screen to conform to a user's viewpoint. For example, if it is identified that the screen direction of the display 310 is rotated from the vertical direction to the horizontal direction (e.g., switching from a portrait mode to a landscape mode), at least one processor 320 may dispose the first screen, based on the lower portion of the expanded display, and dispose the second screen, based on the upper portion of the expanded display. As another example, if it is identified that the screen direction of the display 310 is rotated from the horizontal direction to the vertical direction (e.g., switching from a landscape mode to a portrait mode), at least one processor 320 may identify the grip position of the user after the screen direction is changed. If the identified grip position is in the left portion of the expanded display, at least one processor 320 may dispose the first screen, based on the left portion of the expanded display, and dispose the second screen, based on the right portion of the expanded display. If the identified grip position is in the right portion of the expanded display, at least one processor 320 may dispose the first screen, based on the right portion of the expanded display, and dispose the second screen, based on the left portion of the expanded display.

Figure 4:
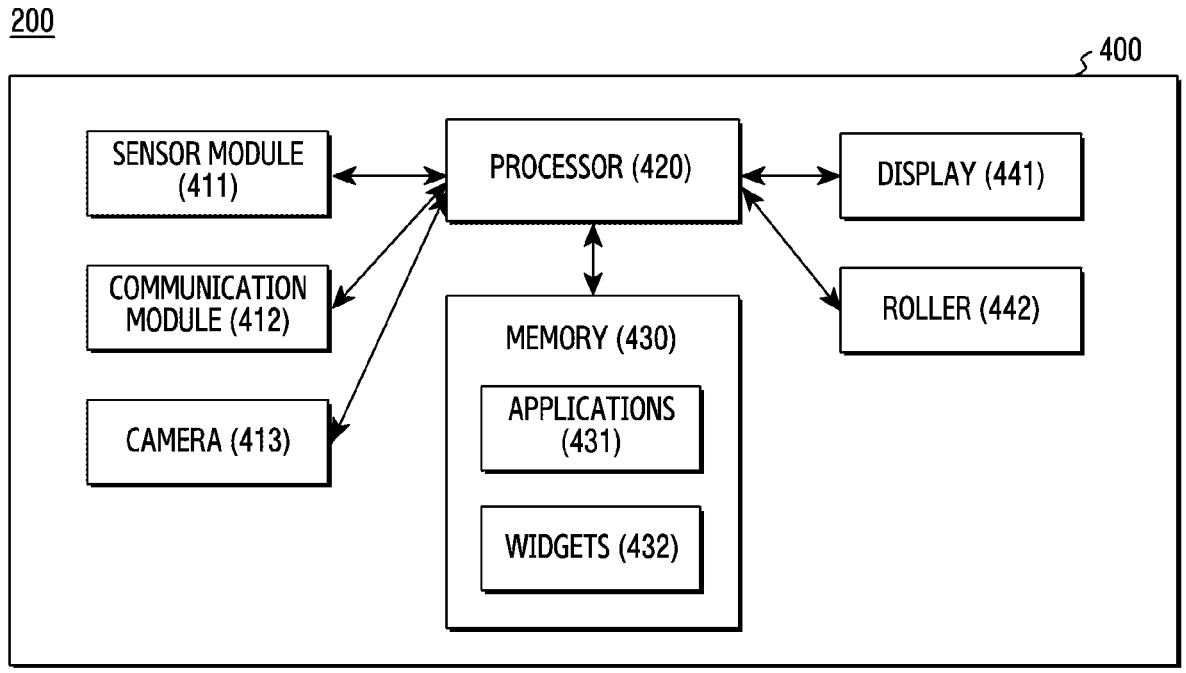
FIG. 4 is a diagram illustrating a detailed configuration of an electronic device according to an example embodiment.

FIG. 4 is a diagram illustrating a detailed configuration of an electronic device 200 according to an embodiment. Each embodiment herein may be used in combination with any other embodiment(s) herein.

Referring to FIG. 4, an electronic device 200 may include a sensor module 411 including sensing circuitry, a communication module 412 including communication circuitry, a camera 413, a processor 420 including processing circuitry, a memory 430, a display 441, or a roller 442. It may be understood that FIG. 4 illustrates an expanded state of the electronic device 200 in FIG. 3. According to various embodiments, in addition to the elements shown in FIG. 4, the electronic device 200 may further include elements corresponding to functions required for the electronic device 200, among the elements shown in FIG. 1.

In an embodiment, the sensor module 411 (e.g., the sensor module 176 in FIG. 1) may detect a user's grip state with respect to the electronic device 200. According to various embodiments, the sensor module 411 may include at least one of a grip sensor, a touch sensor, a pressure sensor, an acceleration sensor, and a gyro sensor. For example, the sensor module 411 may detect which side portion of the display 441 is gripped by the user using at least one sensor. As another example, the sensor module 411 may detect a screen direction exposed through the display 441 using at least one sensor. As another example, the sensor module 411 may detect a user input for changing the shape of the display 441 (e.g., a roll-in/roll-out input according to a rolling operation or a slide-in/slide-out input according to a sliding operation).

In an embodiment, the communication module 412 (e.g., the communication module 190 in FIG. 1) may configure communication connections with one or more external devices (e.g., the electronic device 102 or the electronic device 104 in FIG. 1) and obtain data necessary to identify the grip state from the external device. For example, the communication module 412 may receive sensing data related to hand movement from a wearable device (e.g., a smartwatch) worn on the user or measure a communication distance to the wearable device. As another example, the communication module 412 may obtain sensing data related to hand movement from an electronic pen being used by the user. According to various embodiments, the communication module 412 may include short-range communication such as Bluetooth, Wi-Fi direct, Bluetooth low-energy (BLE), or ultra-wide band (UWB) communication.

In an embodiment, the camera 413 (e.g., the camera module 180, including imaging circuitry, in FIG. 1) may identify a screen direction or extent of expansion of the display 441 in the process of capturing one or more images or videos. For example, the camera 413 may identify a screen direction of the display 441, based on a usage mode (e.g., a landscape mode, a portrait mode, or a selfie mode) according to the user's control. As another example, the camera 413 may identify an expansion direction of the display 441, based on the focus movement direction according to the movement of the display 441 during photographing.

In an embodiment, the at least one processor 420, including processing circuitry, may control various functions or operations of the electronic device 200, and may be understood as the same configuration as the processor 320 illustrated in FIG. 3. The processor 420 may identify the user's grip state and/or the deformation state of the display 441, based on the data obtained through the sensor module 411, the communication module 412, or the camera 413, and perform control to configure and provide a user interface in response to the identified user's grip state and/or deformation state of the display 441.

In an embodiment, the memory 430 (e.g., the memory 130 in FIG. 1) may store instructions that are configured to cause the processor 420 to perform control for various operations and programs or content provided by the electronic device 200, and may correspond to the memory 330 shown in FIG. 3. According to various embodiments, the memory 430 may include an area for storing one or more applications 431 that are installed and executable in the electronic device 200 and an area for storing one or more widgets 432 that may be provided separately from an execution screen of the application. The processor 420 may perform control to output, on the display 441, at least one of an execution screen of the application 431 or a screen of the widget 432, based on the user's grip state and/or the deformation state of the display 441.

In an embodiment, the display 441 is an output means in which the size of a display area exposed to the outside of the housing 400 of the electronic device 200 is variable (e.g., expanded or reduced), and may correspond to the display 310 shown in FIG. 3. The display 441 may output at least one of an execution screen of the application 431 or a screen of the widget 432 through a space exposed to the outside of the electronic device 200. According to various embodiments, the roller 442 may deform the display 441 by rolling or unrolling at least a portion of the display 441. If the display 441 is rolled by the roller 442, at least a portion of the display 441 is received inside the housing 400 so that the display area of the display exposed to the outside may be reduced. If the display 441 is unrolled by the roller 442, at least a portion of the display 441 may be drawn out of the housing 400 so that the display area of the display exposed to the outside may be expanded. According to various embodiments, the processor 420 may control the roller such that the display 441 is automatically expanded when a specified event (e.g., phone notification, message reception, application-related notification reception, or user input) occurs or such that the display 441 is expanded by a specified operation performed by the user (e.g., a rolling-out operation or a sliding-out operation).

FIGS. 5A, 5B, 5C, and 5D are diagrams illustrating a method of dividing a display area, based on a user's grip state, according to an embodiment. According to various embodiments, the electronic device 200 may detect that the display area exposed to the outside is expanded while providing a first screen. The first screen may include at least one of a plurality of pieces of content or an execution screen of an application that the user was watching before the display area is expanded. The display area in the state in which at least portion of the display is rolled by the roller 210 may be unrolled automatically or semi-automatically when a specified event (e.g., phone notification, message reception, application-related notification reception, or user input) occurs or by a specified operation performed by the user (e.g., a rolling-out operation or a sliding-out operation) to be expanded. When the display area is expanded, the electronic device 200 may further provide a second screen that is separated from the first screen. The second screen may include information related to the specified event or additional information on content provided through the first screen. When the display area is expanded, the first screen and the second screen may be displayed at different positions depending on the user's grip state in order to reduce inconvenience such as changing the user's gaze without interfering with the content that the user is watching. For example, the electronic device 200 may identify a direction of the screen exposed through the display according to the user's grip and dispose the first screen and the second screen, based on the identified screen direction.

According to various embodiments, if the screen direction is a vertical direction (e.g., the y-axis direction or a portrait mode direction), the electronic device 200 may further identify the user's grip position according to the grip state and determine the positions of the first screen and the second screen, based on the identified grip position. In the case where the screen direction of the electronic device 200 is a vertical direction (e.g., the y-axis direction or a portrait mode direction), the first screen and the second screen may be disposed as shown in FIG. 5A or 5B.

Figure 5A:
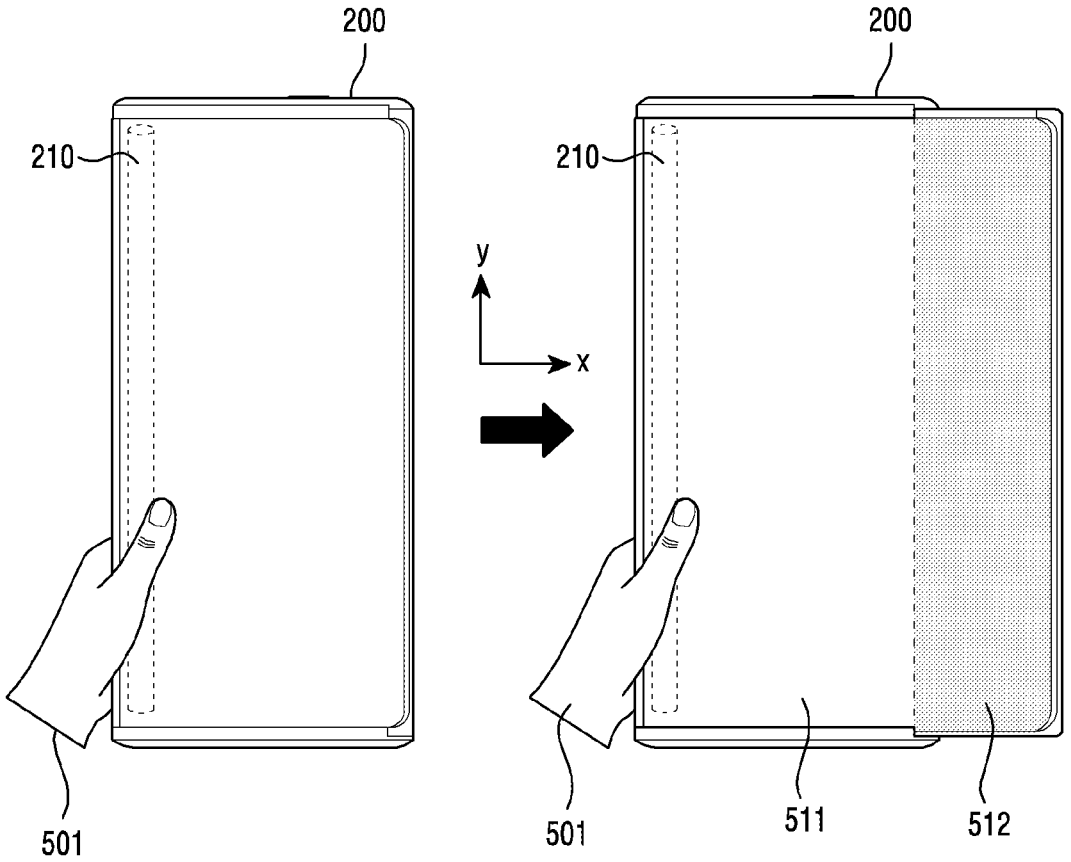
FIGS. 5A, 5B, 5C, and 5D are diagrams illustrating a method of dividing a display area, based on a user's grip state, according to an example embodiment.

In FIG. 5A, the electronic device 200 may identify that the left portion of the display is gripped by the user's left hand 501 while the first screen is displayed before the display area of the display is expanded. In the case where the left portion of the display is gripped, the electronic device 200 may determine a first area 511 to display the first screen after the display area of the display is expanded, based on the left portion of the expanded display. The size of the first area 511 may correspond to the size of the display area of the display before expansion. In an embodiment, the electronic device 200 may identify whether or not the determined first area 511 corresponds to a drawing-out direction of the display. The electronic device 200 may determine a direction opposite the direction in which the roller 210 is positioned based on the display, as the drawing-out direction of the display. In FIG. 5A, since the first area 511 is disposed on the left side of the expanded display and since the display is drawn out and expanded to the right by the roller 210, the electronic device 200 may identify that the first area 511 does not correspond to the drawing-out direction of the display. In this case, the electronic device 200 may shift the first screen in the left direction of the expanded display in synchronization with a speed at which the display is drawn out. In an embodiment, the electronic device 200 may determine the remaining display areas, excluding the first area 511, in the expanded display as a second area 512 to display the second screen. In FIG. 5A, the second area 512 may be determined based on the right portion of the expanded display, and the size of the second area 512 may correspond to the size of the display area drawn out by the roller 210.

Figure 5B:
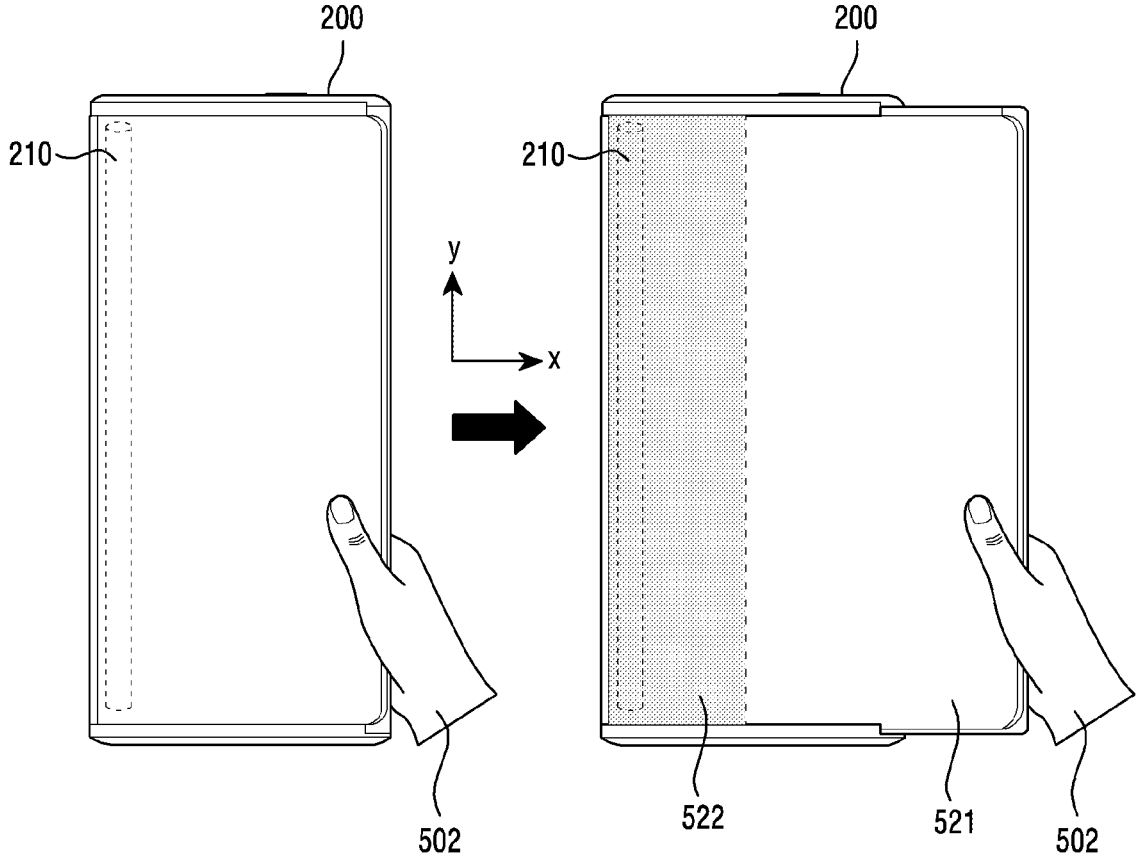

In FIG. 5B, the electronic device 200 may identify that the right portion of the display is gripped by the user's right hand 502 while the first screen is displayed before the display area of the display is expanded. In the case where the right portion of the display is gripped, the electronic device 200 may determine a first area 521 to display the first screen after the display area is expanded based on the right portion of the expanded display. The size of the first area 521 may correspond to the size of the display area before expansion. In an embodiment, the electronic device 200 may identify whether or not the determined first area 521 corresponds to the drawing-out direction of the display. The electronic device 200 may determine a direction opposite the direction in which the roller 210 is positioned based on the display, as the drawing-out direction of the display. In FIG. 5B, since the first area 521 is disposed on the right side of the expanded display and/or since the display is drawn out and expanded to the right by the roller 210, the electronic device 200 may identify that the first area 521 corresponds to the drawing-out direction of the display. In this case, since the user is gripping the right portion of the display, even if the display is drawn out to the right, the user may recognize that the display area of the display seems to be expanded to the left, and the first screen may be consistently displayed while maintaining an existing position. In an embodiment, the electronic device 200 may determine the remaining display areas, excluding the first area 521, in the expanded display as a second area 522 to display the second screen. In FIG. 5B, the second area 522 may be determined based on the left portion of the expanded display, and the size of the second area 522 may correspond to the size of the display area drawn out by the roller 210.

According to various embodiments, when the screen direction is a vertical direction (e.g., the y-axis direction or a portrait mode direction), the electronic device 200 may identify that both the left portion and the right portion of the display are gripped by the user. In this case, the electronic device 200 may determine the direction of the first area 511 or 521 by giving priority to the portion in which the grip is maintained for a long time. For example, if one hand is separated in the gripping state by both hands, the electronic device 200 may determine the first area 511 or 521, based on the portion where the gripping is continued. As another example, even if the electronic device 200 detects that the display 310 is expanded in the gripping state by one hand and that the electronic device is further gripped by the other hand thereafter, the electronic device 200 may maintain the existing display state without changing the first area 511 or 521. If the electronic device 200 determines the first area 511, based on the left area of the expanded display, by identifying that the left portion of the display is gripped in FIG. 5A and identifies that the right portion of the display is further gripped thereafter, the electronic device 200 may give priority to the left-portion gripping state and maintain the determined first area 511 as it is.

According to various embodiments, if the screen direction is a horizontal direction (e.g., the x-axis direction or a landscape mode direction), the electronic device 200 may assume that the lower portion of the display is gripped in consideration of general user behavior patterns and determine the positions of the first screen and the second screen. If the screen direction of the electronic device 200 is a horizontal direction (e.g., the x-axis direction or a landscape mode direction), the first screen and the second screen may be disposed as shown in FIG. 5C or 5D.

Figure 5C:
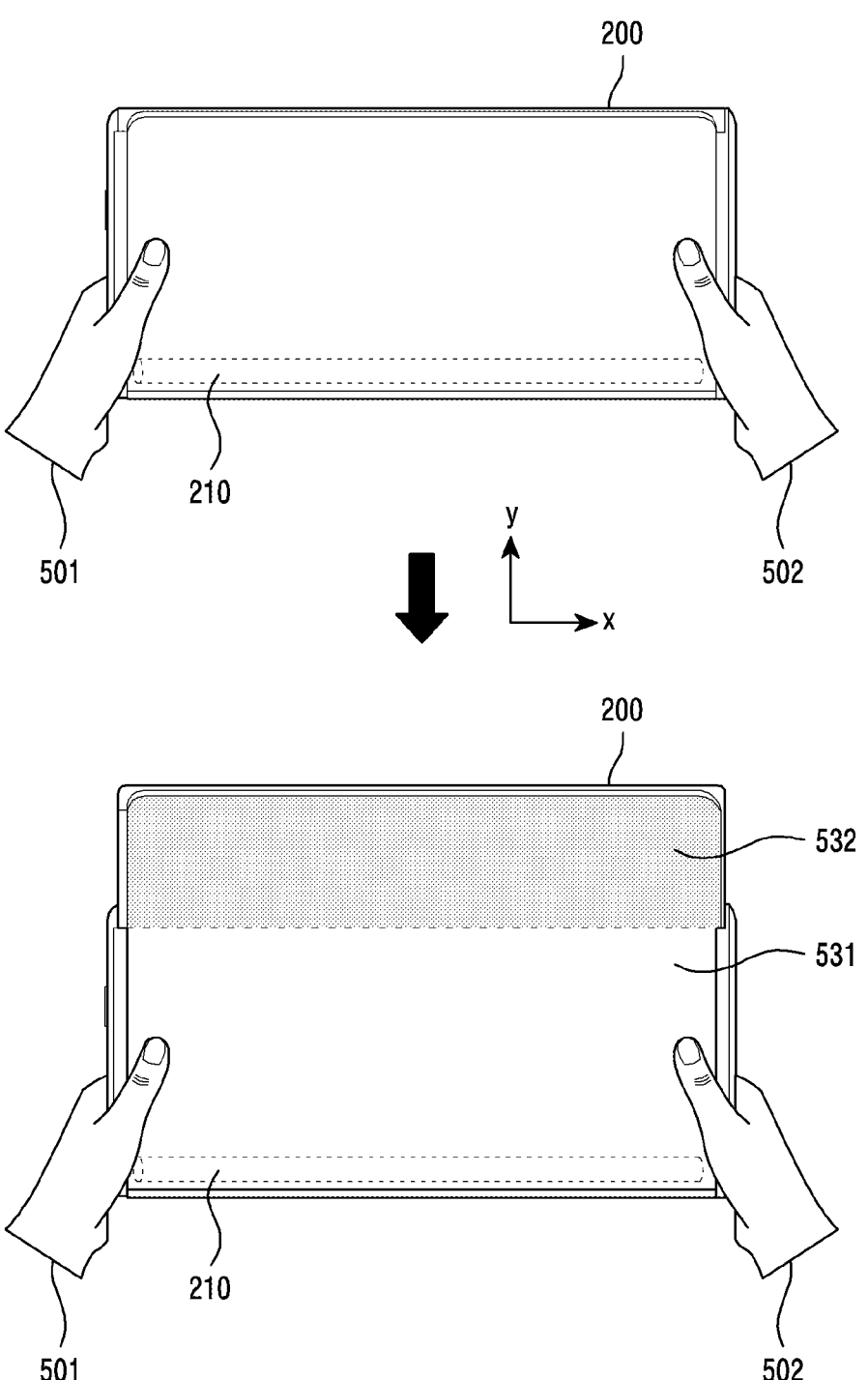

In FIG. 5C, the electronic device 200 may identify that the lower portion of the display is gripped by the user's left hand 501 and/or right hand 502 while the first screen is displayed before the display area of the display is expanded. The electronic device 200 may determine a first area 531 to display the first screen after the display area of the display is expanded based on the lower portion of the expanded display. The size of the first area 531 may correspond to the size of the display area of the display before expansion. In an embodiment, the electronic device 200 may identify whether or not the determined first area 531 corresponds to the drawing-out direction of the display. The electronic device 200 may determine a direction opposite the direction in which the roller 210 is positioned with respect to the display as the drawing-out direction of the display. In FIG. 5C, since the first area 531 is disposed in the lower direction of the expanded display and since the display is drawn out and expanded in the upper direction by the roller 210, the electronic device 200 may identify that the first area 531 does not correspond to the drawing-out direction of the display. In this case, the electronic device 200 may shift the first screen in a lower direction of the expanded display in synchronization with a speed at which the display is drawn out. In an embodiment, the electronic device 200 may determine the remaining display areas, excluding the first area 531, in the expanded display as a second area 532 to display the second screen. In FIG. 5C, the second area 532 may be determined based on the upper portion of the expanded display, and the size of the second area 532 may correspond to the size of the display area drawn out by the roller 210.

Figure 5D:
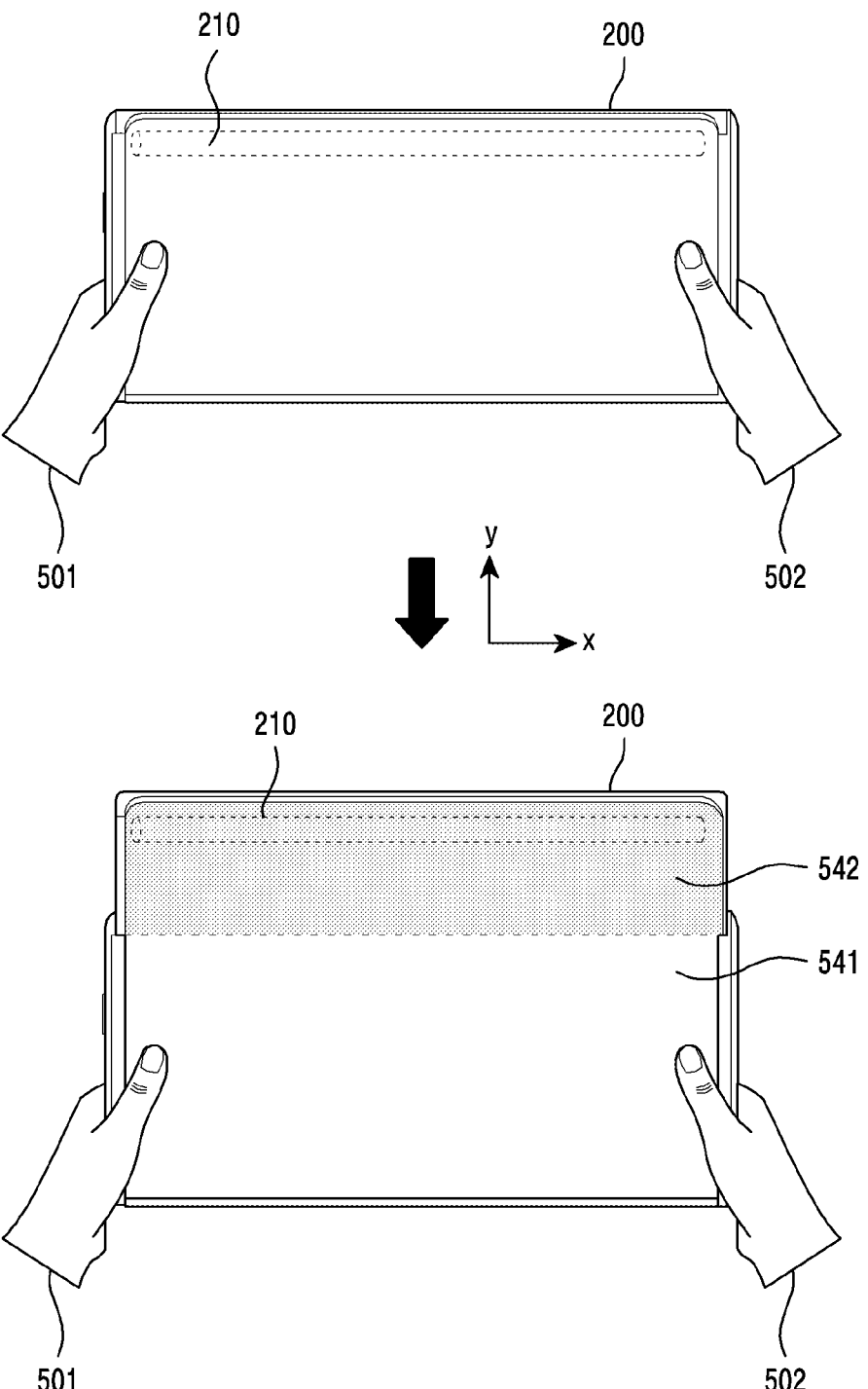

In FIG. 5D, the electronic device 200 may identify that the lower portion of the display is gripped by the user's left hand 501 and/or right hand 502 while the first screen is displayed before the display area of the display is expanded. The electronic device 200 may determine a first area 541 to display the first screen after the display area is expanded based on the lower portion of the expanded display. The size of the first area 541 may correspond to the size of the display area before expansion. In an embodiment, the electronic device 200 may identify whether or not the determined first area 541 corresponds to the drawing-out direction of the display. The electronic device 200 may determine a direction opposite the direction in which the roller 210 is positioned with respect to the display as the drawing-out direction of the display. In FIG. 5D, since the first area 541 is disposed in the lower direction of the expanded display and since the display is drawn out and expanded in the lower direction by the roller 210, the electronic device 200 may identify that the first area 541 corresponds to the drawing-out direction of the display. In this case, since the user is gripping the lower portion of the display, even if the display is drawn out in the lower direction, the user may recognize that the display area seems to be expanded in the upper direction, and the first screen may be consistently displayed while maintaining an existing position. In an embodiment, the electronic device 200 may determine the remaining display areas, excluding the first area 541, in the expanded display as a second area 542 to display the second screen. In FIG. 5D, the second area 542 may be determined based on the left portion of the expanded display, and the size of the second area 542 may correspond to the size of the display area drawn out by the roller 210.

Figure 6A:
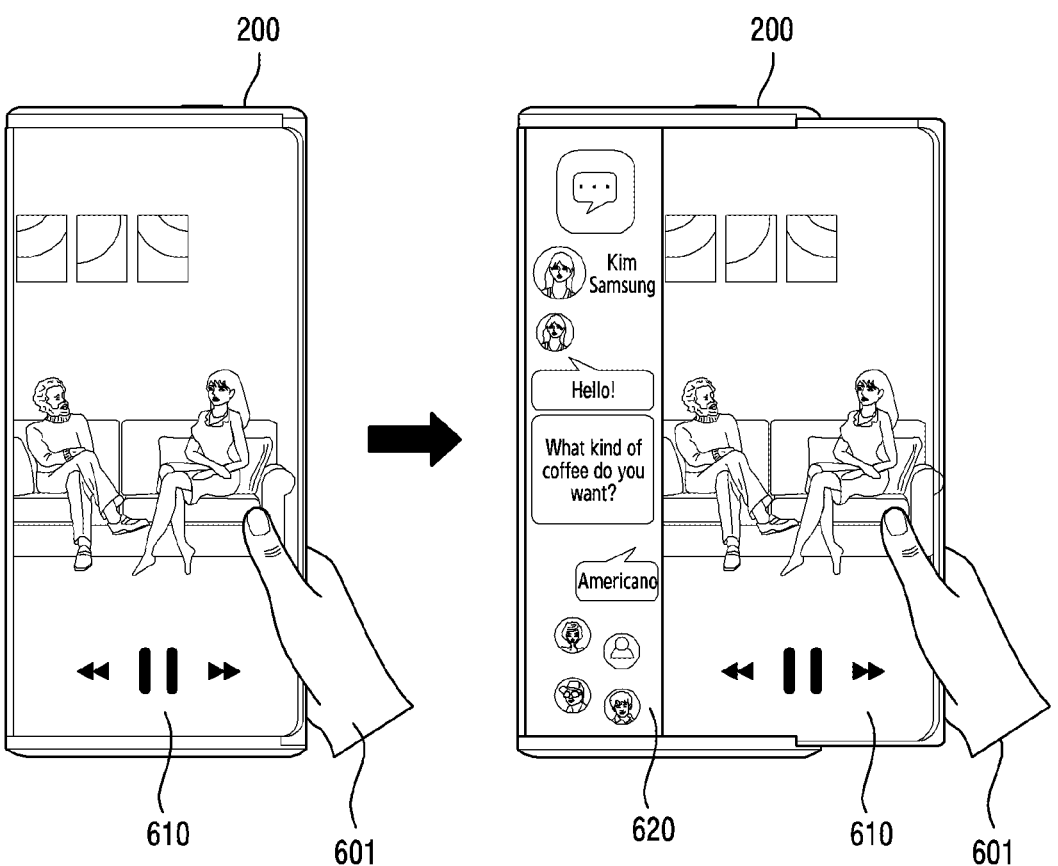
FIGS. 6A, 6B, and 6C are diagrams illustrating a method of providing a first screen and/or a second screen in consideration of a user's grip state when a display is expanded according to an example embodiment.
Figure 6B:
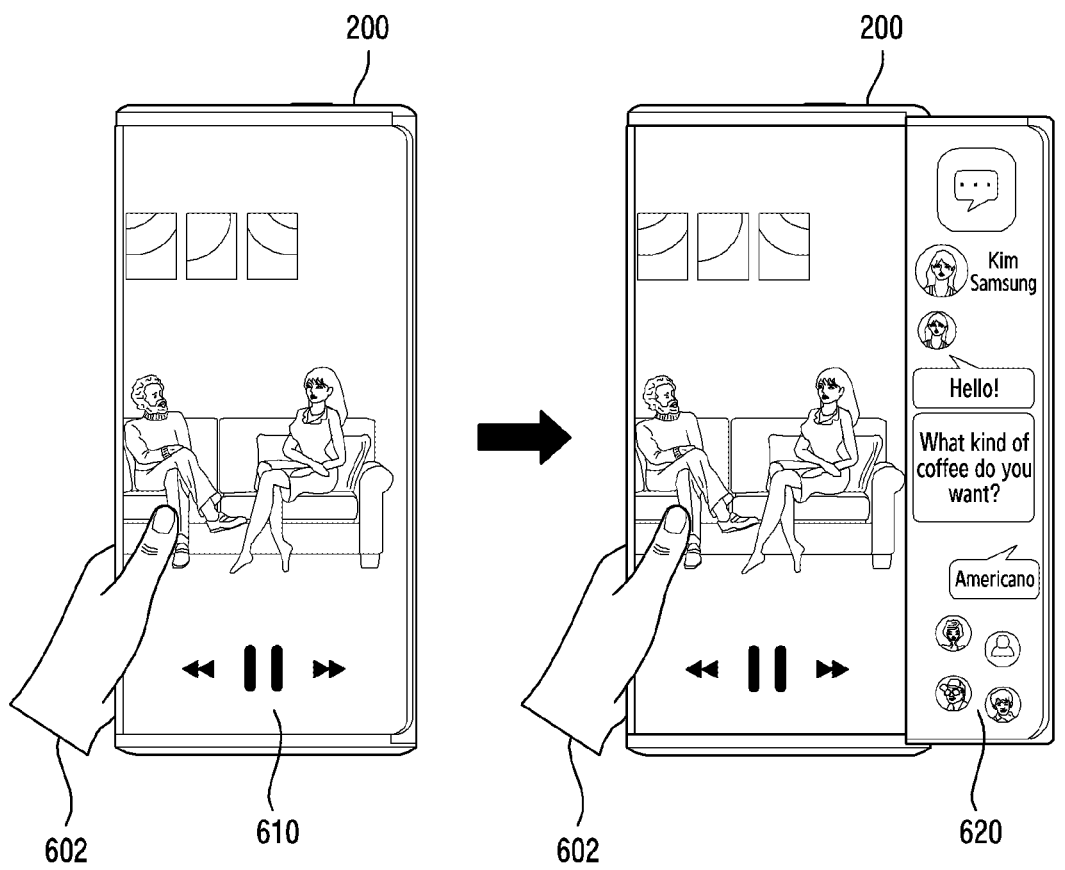
Figure 6C:
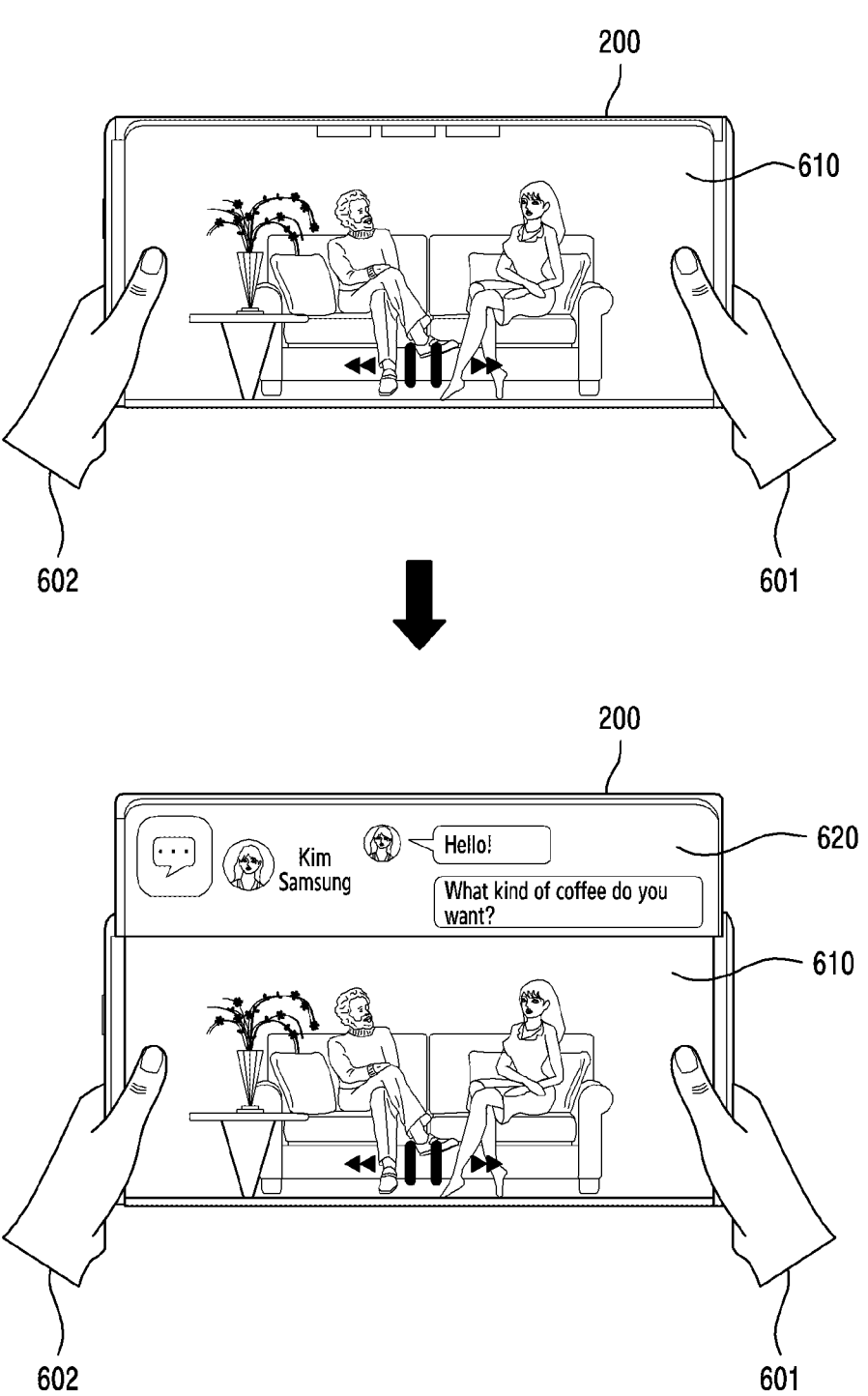

FIGS. 6A, 6B, and 6C are diagrams illustrating a method of providing a first screen 610 and/or a second screen 620 in consideration of a user's grip state when a display is expanded according to an embodiment. According to various embodiments, if it is detected that the display area is expanded while providing a first screen, the electronic device 200 may provide a first screen 610 and/or a second screen 620, based on the user's grip state. The first screen 610 may be an execution screen of a video application being executed before the display area is expanded. The second screen 620 is a screen that is further displayed after the display area is expanded, and may include information related to an event that occurs while the first screen 610 is provided or additional information about the content provided through the first screen 610. The event may include at least one of phone notification, message reception, application-related notification reception, and user input.

In FIG. 6A, the electronic device 200 may display the first screen 610 in the state where at least a portion of the display is received in the housing. The electronic device 200 may identify that at least a portion of the display is drawn out of the housing while displaying the first screen 610 so that the display area exposed to the outside is expanded. For example, the electronic device 200 may perform control such that the display area is automatically expanded in response to detecting occurrence of the event. As another example, the electronic device 200 may perform control such that the display area is expanded if an operation specified by the user (a rolling-out operation or a sliding-out operation) is performed or if a user's touch input is detected after the event occurs. According to an embodiment, in the case where a roller for rolling or unrolling at least a portion of the display is positioned on the left side of the display, the electronic device 200 may identify that the display is drawn out to the right by the roller while the display area is expanded. In FIG. 6A, the electronic device 200 may identify that the right portion of the display is gripped by the user's right hand 601 while the first screen 610 is displayed and determine to provide the first screen 610, based on the right portion of the expanded display. In this case, since the position where the first screen 610 is displayed when the display area is expanded corresponds to the drawing-out direction of the display, the electronic device 200 may perform control such that the first screen 610 is consistently displayed while maintaining an existing position. The second screen 620 further provided when the display area is expanded may be displayed on the remaining display areas, excluding the area in which the first screen 610 is provided, in the expanded display. For example, the electronic device 200 may determine to provide the second screen 620, based on a left direction opposite the position gripped by the user, and display the second screen 620 on the display area drawn out of the housing when the display is expanded.

In FIG. 6B, the electronic device 200 may display the first screen 610 in the state where at least a portion of the display is received in the housing. The electronic device 200 may identify that at least a portion of the display is drawn out of the housing while displaying the first screen 610 so that the display area exposed to the outside is expanded. In FIG. 6B, the electronic device 200 may identify that the left portion of the display is gripped by the user's left hand 602 while the first screen 610 is displayed and determine to provide the first screen 610, based on the left portion of the expanded display. In this case, since the position where the first screen 610 is displayed when the display area is expanded does not correspond to the drawing-out direction of the display, the electronic device 200 may shift the first screen 610 in the left direction of the expanded display. In order to minimize or reduce the inconvenience that the user may feel in the process of moving the first screen 610, the electronic device 200 may perform control such that the first screen is shifted in the left direction of the expanded display in synchronization with a speed at which the display is drawn out. The second screen 620 further provided when the display area is expanded may be displayed on the remaining display areas, excluding the area in which the first screen 610 is provided, in the expanded display. For example, the electronic device 200 may determine to provide the second screen 620, based on a right direction opposite the position gripped by the user, and display the second screen 620 on the display area that is blank due to shifting of the first screen 610 when the display is expanded.

In FIG. 6C, the electronic device 200 may display the first screen 610 in a horizontal direction (or a transverse direction) in the state where at least a portion of the display is received in the housing. The electronic device 200 may identify that at least a portion of the display is drawn out of the housing while displaying the first screen 610 so that the display area exposed to the outside is expanded. In FIG. 6C, the electronic device 200 may identify that the lower portion of the display is gripped by the user's right hand 601 and/or left hand 602 while the first screen 610 is displayed and determine to provide the first screen 610, based on the lower portion of the expanded display. According to an embodiment, the electronic device 200 may determine a direction opposite the position of a roller for rolling or unrolling at least a portion of the display as the drawing-out direction of the display. For example, if the roller is positioned in the lower portion of the display, the electronic device 200 may identify that the display is drawn out by the roller in the upper direction while the display area is expanded. In this case, since the position where the first screen 610 is displayed when the display area is expanded does not correspond to the drawing-out direction of the display, the electronic device 200 may shift the first screen 610 in the lower direction of the expanded display. In order to minimize or reduce the inconvenience that the user may feel in the process of moving the first screen 610, the electronic device 200 may perform control such that the first screen is shifted in the lower direction of the expanded display in synchronization with a speed at which the display is drawn out. As another example, if the roller is positioned in the upper portion of the display, the electronic device 200 may identify that the display is drawn out by the roller in the lower direction while the display area is expanded. In this case, since the position where the first screen 610 is displayed when the display area is expanded corresponds to the drawing-out direction of the display, the electronic device 200 may perform control such that the first screen 610 is consistently displayed while maintaining an existing position. The second screen 620 further provided when the display area is expanded may be displayed on the remaining display areas, excluding the area in which the first screen 610 is provided, in the expanded display. For example, the electronic device 200 may determine to provide the second screen 620, based on the upper direction of the expanded display.

Figure 7:
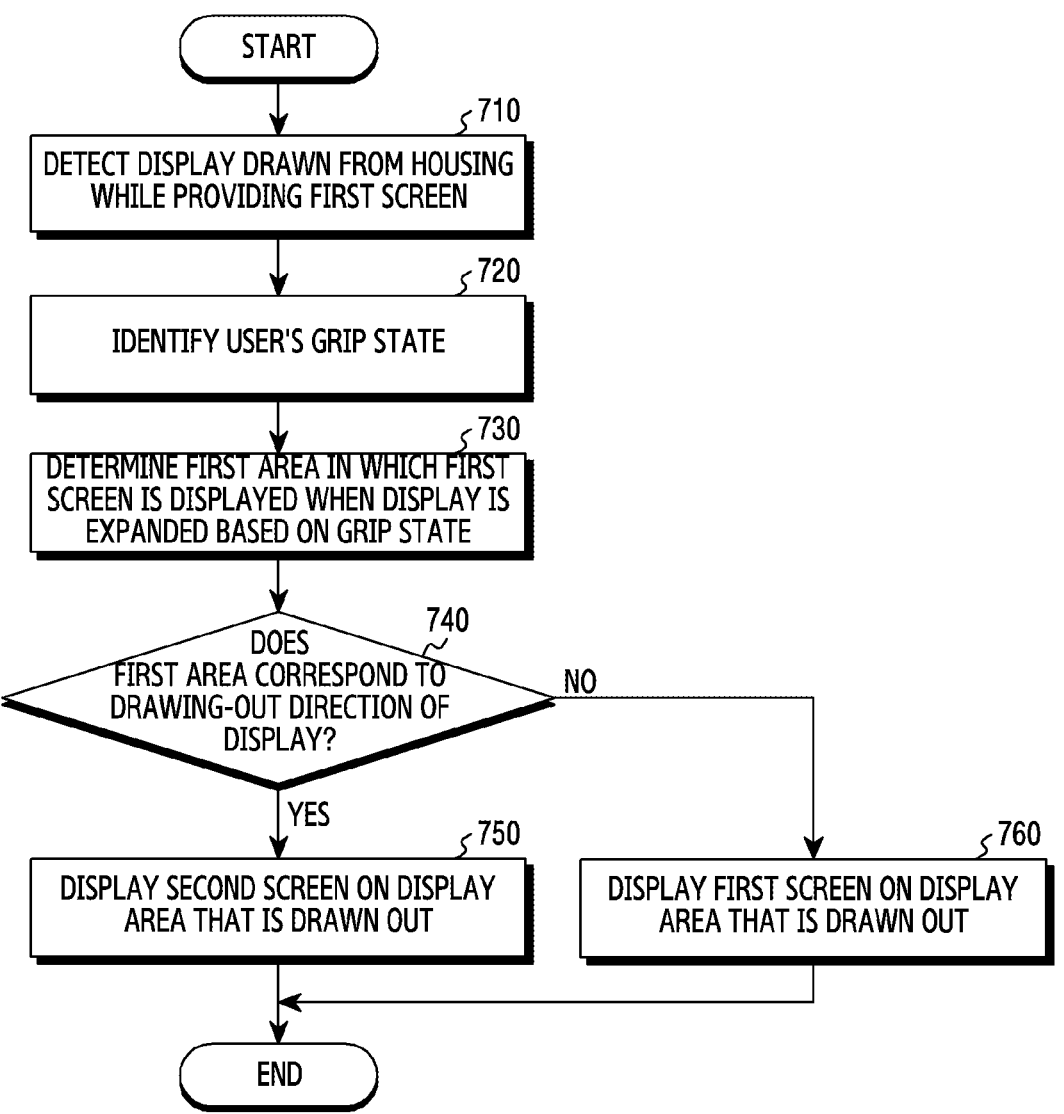
FIG. 7 is a flowchart illustrating a method of operating an electronic device according to an example embodiment.

FIG. 7 is a flowchart illustrating a method of operating an electronic device according to an embodiment. According to an embodiment, the electronic device 200 is a flexible type device in which the size of a display area exposed to the outside is variable, and may correspond to the electronic device 101 shown in FIG. 1 or the electronic device 200 shown in FIG. 2. The operations in FIG. 7 may be performed by at least one processor (e.g., the processor 120 in FIG. 1 or at least one processor 320 in FIG. 3) included in the electronic device 200.

Referring to FIG. 7, in operation 710, the electronic device 200 may detect that a display (e.g., the display module 160 in FIG. 1 or the display 310 in FIG. 3) is expanded from the housing while providing a first screen. The first screen may include at least one of a plurality of pieces of content or an execution screen of an application that the user was watching before the display 310 is expanded. The electronic device 200 may determine whether or not the display 310 is expanded by detecting whether the display 310 is rolled or unrolled by a roller included in the housing. If at least a partial area of the display 310 is unrolled by the roller included in the housing in the state of being received inside the housing, at least one processor 320 may identify that the display 310 is expanded from the housing. According to various embodiments, the electronic device 200 may control the roller such that the display 310 is automatically expanded when a specified event (e.g., phone notification, message reception, application-related notification reception, or user input) occurs or such that the display 310 is expanded by a specified operation performed by the user (e.g., a rolling-out operation or a sliding-out operation).

According to an embodiment, in operation 720, the electronic device 200 may identify a user's grip state. For example, the grip state may include at least one of a screen direction exposed through the display 310 or a grip position of the user.

According to an embodiment, in operation 730, the electronic device 200 may determine a first area in which the first screen is displayed when the display 310 is expanded based on the identified grip state. Details regarding the determination of the first area in operation 730 will be described with reference to FIG. 8.

Figure 8:
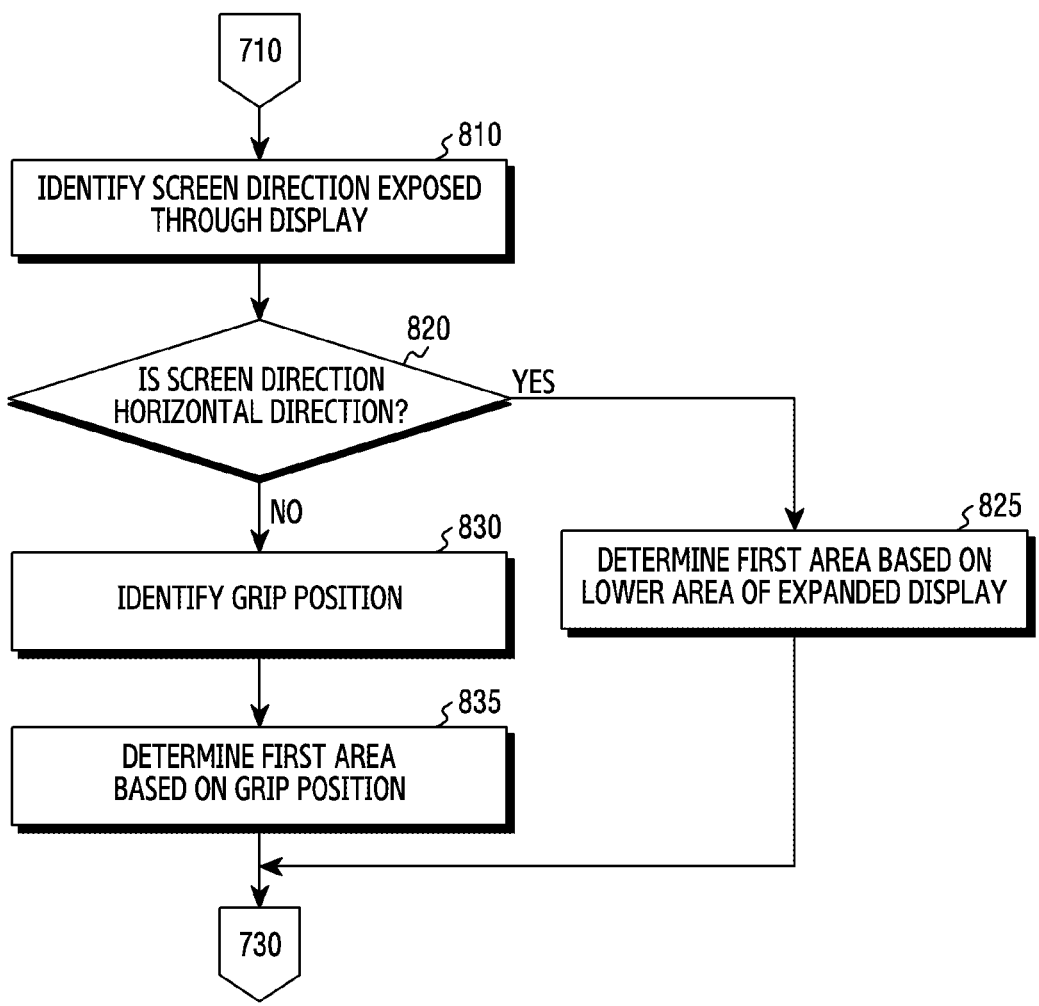
FIG. 8 is a diagram illustrating a process of determining an area on which a first screen is displayed based on a user's grip state according to an example embodiment.

Referring to FIG. 8, in operation 810, the electronic device 200 may identify a screen direction exposed through the display 310, based on the grip state. For example, the electronic device 200 may detect whether the screen direction of the display 310 is rotated to any one of a horizontal direction or a vertical direction by the user's grip.

According to an embodiment, in operation 820, the electronic device 200 may determine whether or not the identified screen direction is a horizontal direction (e.g., the x-axis direction or a landscape mode direction). If it is identified that the screen direction is the horizontal direction as a result of the identification (YES in operation 820), the electronic device 200 may determine the first area, based on the lower area of the expanded display in operation 825. If the screen direction is the horizontal direction, the electronic device 200 may assume that the lower portion of the display 310 is gripped according to general user behavior patterns and determine the position of the first area, based on lower area of the expanded display.

If it is identified that the screen direction is a vertical direction (e.g., the y-axis direction or a portrait mode direction) as a result of the identification (NO in operation 820), the electronic device 200 may further identify the user's grip position in operation 830. According to various embodiments, the electronic device 200 may determine whether the position gripped by the user is the left portion or right portion of the display 310, based on the grip state. For example, the electronic device 200 may identify the grip position, based on a mainly used direction configured by the user. In the case where a one-handed manipulation mode is configured, the electronic device 200 may identify the grip position, based on the mainly used direction (or the hand that is mainly used) selected by the user. As another example, the electronic device 200 may identify the grip position using one or more sensors (e.g., the sensor module 176 in FIG. 1). The one or more sensors may include at least one of a grip sensor, a touch sensor, a pressure sensor, an acceleration sensor, and a gyro sensor. The electronic device 200 may identify which side portion of the display 310 is gripped based on sensing data obtained from the one or more sensors. The electronic device 200 may identify the grip position, based on an edge display area in which gripping of the user is detected. As another example, the electronic device 200 may identify the grip position using a wearable device (e.g., a smartwatch) worn on the user or an electronic pen being used by the user. In the case where the electronic pen being used by the user. In the case where the electronic device 200 recognizes whether the user wears the wearable device on the right or left wrist, the electronic device 200 may identify whether a right or left hand grips the electronic device 200, based on at least one of a communication distance to the wearable device and sensing data obtained from a gyro sensor of the wearable device. When using an electronic pen, the electronic device 200 may identify the directions of the hand holding the electronic pen and the hand gripping the electronic device 200, based on at least one of an input direction or angle of an electronic pen or sensing data obtained from a gyro sensor inside the electronic pen, and determine the grip position, based on the identification result. According to an embodiment, in operation 835, the electronic device 200 may determine the first area, based on the identified grip position. For example, if the grip position is identified to be in a left portion of the display 310, the electronic device 200 may determine the first area, based on the left area of the expanded display. As another example, if the grip position is identified to be in a right portion of the display 310, the electronic device 200 may determine the first area, based on the right area of the expanded display. According to various embodiments, if it is identified that both the left portion and the right portion of the display 310 are gripped, the electronic device 200 may determine the first area, based on one of the both portions where the grip is maintained for a long time. For example, if one hand is separated in the gripping state by both hands, the electronic device 200 may identify the portion where the grip lasts and determine the grip position. As another example, even if the electronic device 200 detects that the display 310 is expanded in the state of being gripped by one hand and that the display is further gripped by the other hand thereafter, the electronic device 200 may maintain the existing display state without changing the first area. If the electronic device 200 determines the first area, based on the left area of the expanded display, by identifying that the left portion of the display 310 is gripped by the user and identifies that the right portion of the display 310 is further gripped thereafter, the electronic device 200 may give priority to the left-portion gripping state and maintain the determined direction of the first area as it is.

Referring back to FIG. 7, in operation 740, the electronic device 200 may determine whether or not the determined first area corresponds to the drawing-out direction of the display 310. According to various embodiments, the drawing-out direction of the display 310 may be determined based on the position of a roller that rolls or unrolls at least a portion of the display 310. The electronic device 200 may determine the drawing-out direction of the display 310 to be a direction opposite the direction in which the roller is positioned with respect to the display 310. For example, if the roller is position in the left portion of the display 310 (at least a portion of the display 310, which is in the state of being received in the left portion, is unrolled by the roller to be expanded), the electronic device 200 may identify that the display 310 is drawn out in the right direction. As another example, if the roller is positioned in the lower portion of the display 310 (at least a portion of the display 310 is received inside the lower portion and is then unrolled by the roller to be expanded), electronic device 200 may identify that the display 310 is drawn out in the upper direction. According to various embodiments, the electronic device 200 may determine the drawing-out direction of the display 310 to correspond to a direction in which a user input for expanding the display 310 (e.g., a roll-out input according to a rolling operation or a slide-out input according to a sliding operation) is applied.

As a result of the identification, if the first area corresponds to the drawing-out direction of the display 310 (YES in operation 740), the electronic device 200 may display a second screen, which is separated from the first screen, on the display area that is drawn out of the housing in operation 750. If the first area determined based on the user's grip state corresponds to the drawing-out direction of the display 310, the position of the first area is in a display area that is always exposed to the outside, so the first screen may be consistently displayed while maintaining an existing position. In this case, the second area to be further exposed as the display 310 is expanded may be determined to be positioned in the display area that is received inside the housing and then drawn out of the same. The size of the second area may correspond to the size of the display area drawn out of the housing. The electronic device 200 may display a second screen, which is different from the first screen, on the second area. According to various embodiments, the second screen may include information related to an event that occurs while providing the first screen. The event may include at least one of phone notification, message reception, application-related notification reception, or user input. If it is detected that the event occurs while providing the first screen in the state in which at least a portion of the display 310 is received inside the housing, the electronic device 200 may produce a second screen including information related to the event. The electronic device 200 may draw the display 310 out of the housing automatically in response to the occurrence of the event or based on a user input or operation detected after the occurrence of the event, and display the produced second screen on the second area.

As a result of the identification, if the first area does not correspond to the drawing-out direction of the display 310 (NO in operation 740), the electronic device 200 may move the first screen to the first area and display the first screen on the display area drawn out of the housing in operation 760. In the case where the first area determined based on the user's grip state does not correspond to the drawing-out direction of the display 310, the position of the first area is in the display area that is received inside the housing and then drawn out of the same, so the first screen may be moved to the display area drawn out of the housing and then displayed thereon. At this time, the electronic device 200 may perform control such that the first screen is shifted to the first area in synchronization with a speed at which the display 310 is drawn out of the housing. In this case, the second area further exposed as the display 310 is expanded may be determined to be always positioned in the display area exposed to the outside. The size of the second area may correspond to the size of the display area drawn out of the housing.

Figure 9A:
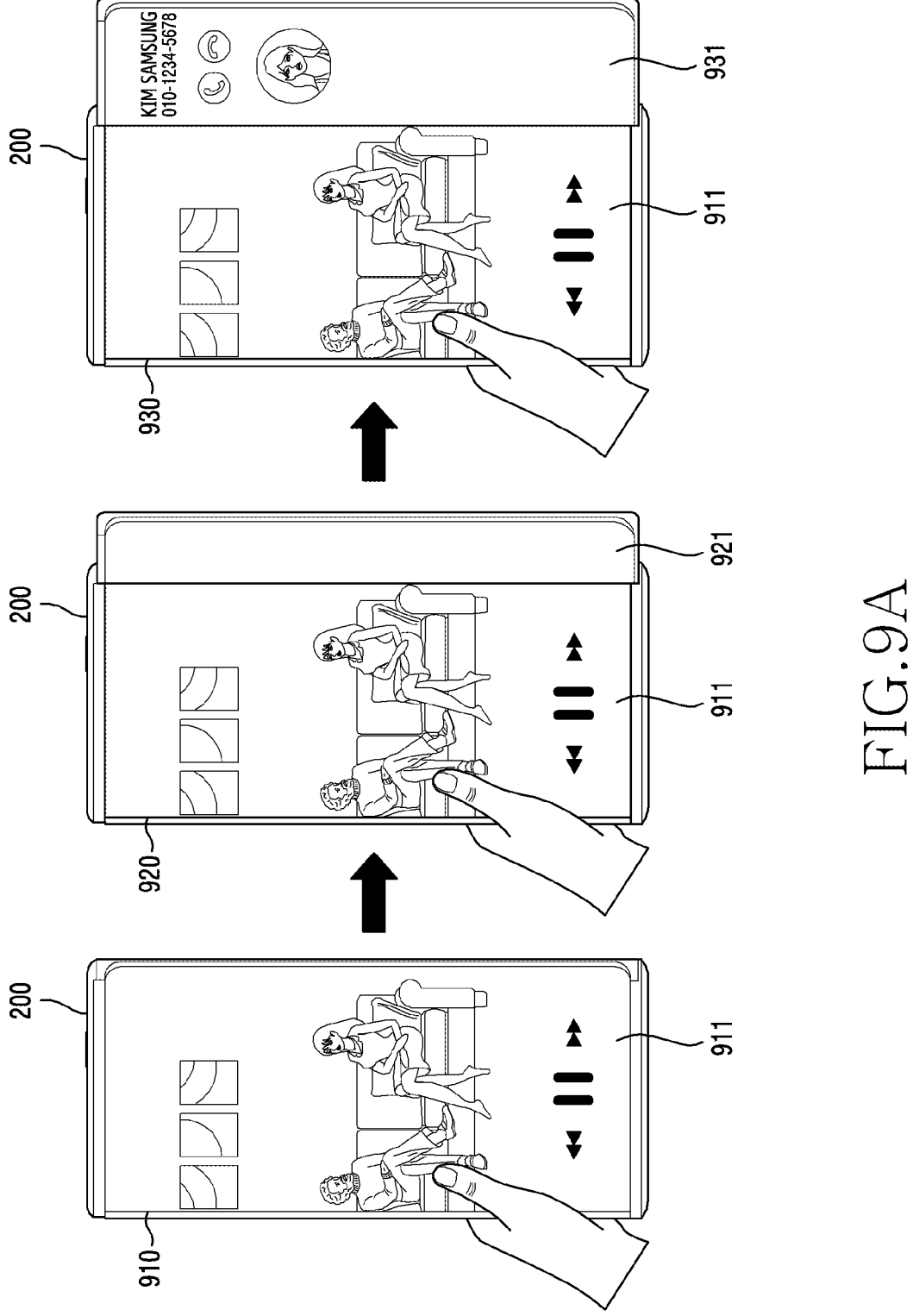
FIGS. 9A, 9B, and 9C are diagrams illustrating a method of further providing a second screen in response to an event detected during execution of a video application according to an example embodiment.
Figure 9B:
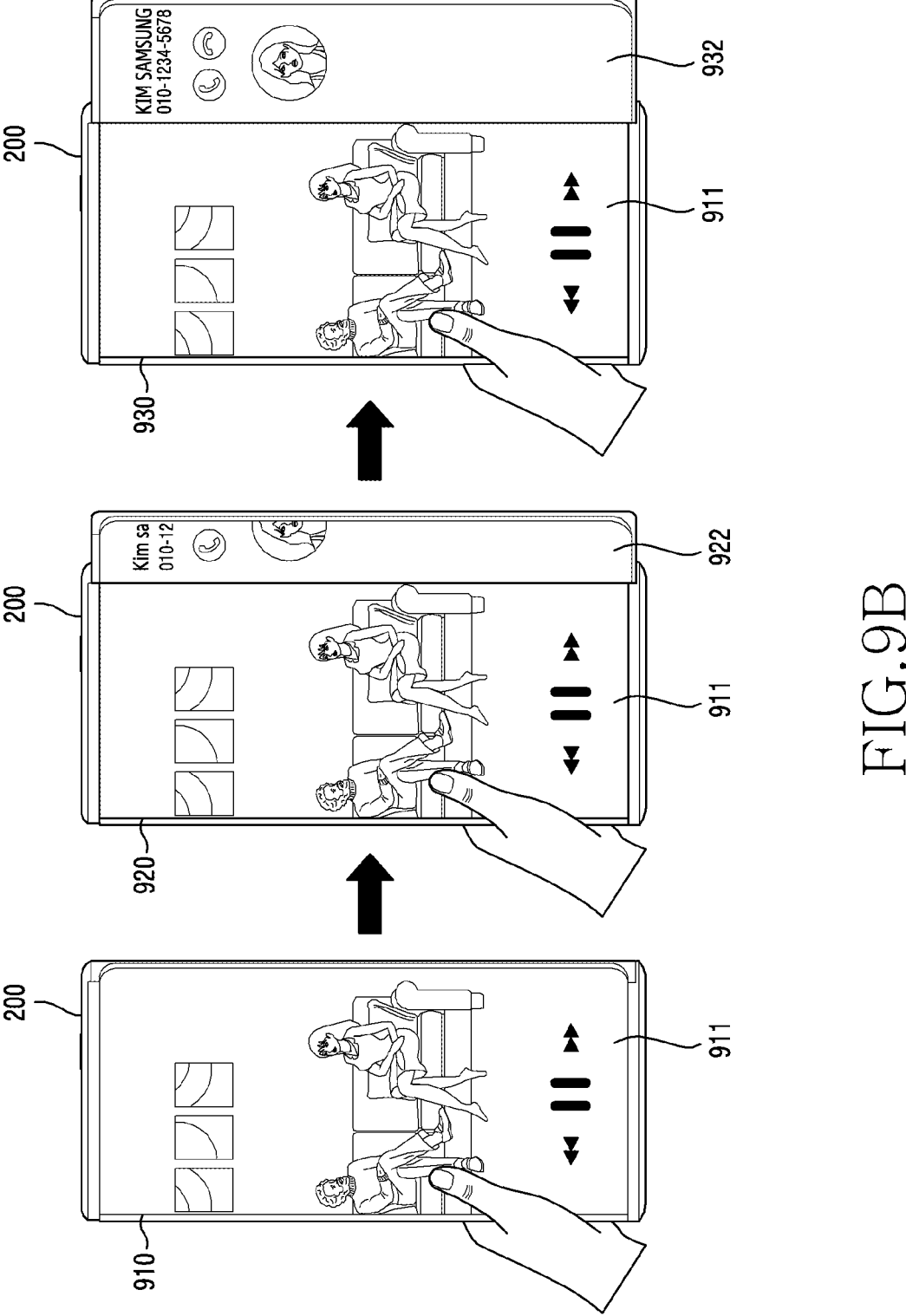
Figure 9C:
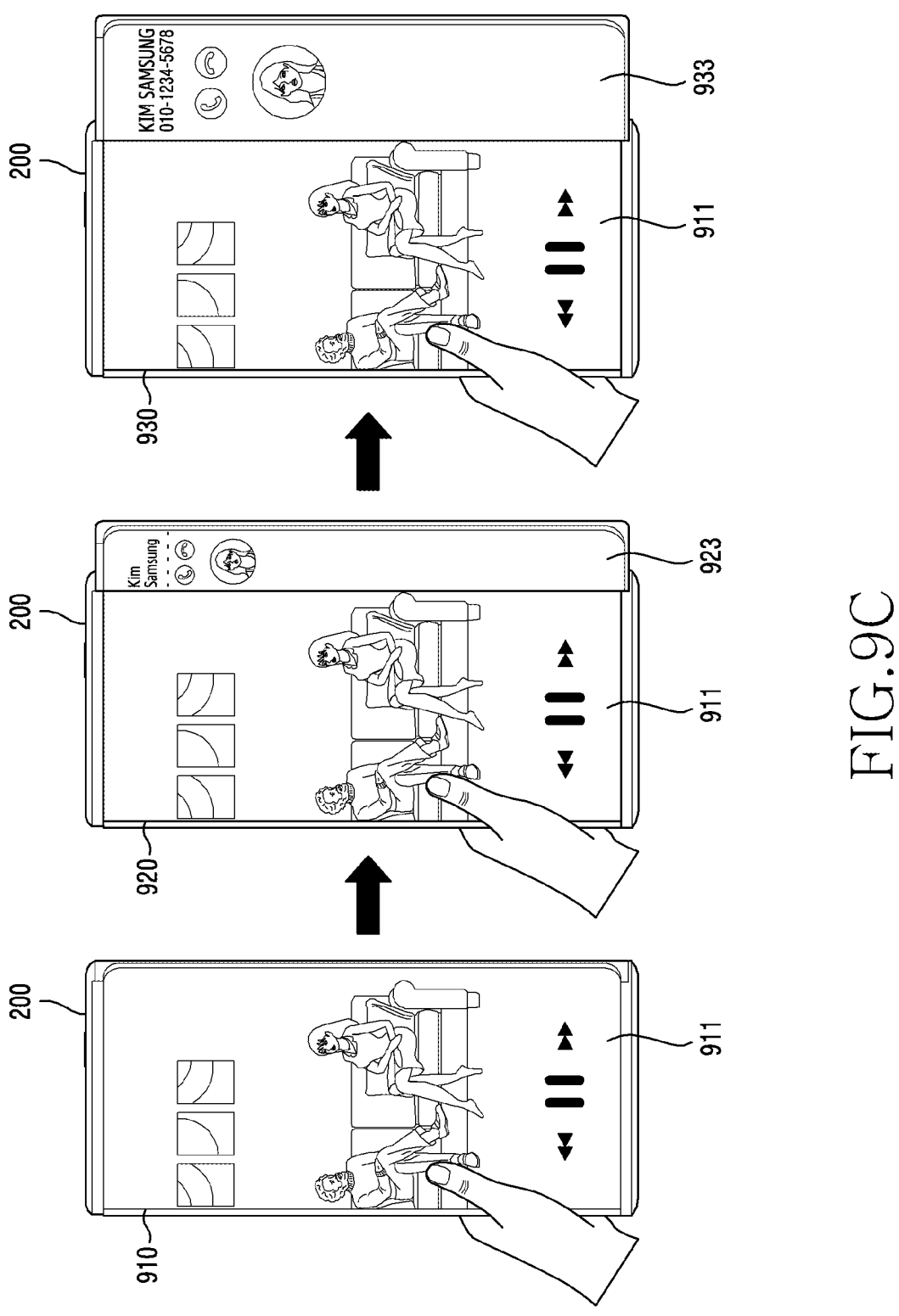

FIGS. 9A, 9B, and 9C are diagrams illustrating a method of further providing a second screen in response to an event detected during execution of a video application according to an embodiment. According to various embodiments, the electronic device 200 may detect that a specified event occurs while providing a first screen 911 by executing a video application. For example, the first screen 911 may include an execution screen of the video application, and the specified event may be notification of a call received while the video application is running. The electronic device 200 may produce a second screen related to the call notification in response to receiving the call notification, and provide the second screen when a display area is expanded. The display area may be automatically expanded when the specified event occurs or may be expanded by a specified operation performed by the user (e.g., a rolling-out operation or a sliding-out operation). According to various embodiments, the electronic device 200 may identify that a roller for rolling or unrolling at least a portion of a display (e.g., the display module 160 in FIG. 1 or the display 310 in FIG. 3) is positioned on the left side of the display 310 and identify that the display 310 is drawn out in the right direction by the roller while the display area is expanded. The electronic device 200 may provide the second screen differently depending on the size of the display area of the display 310 that is drawn out of the housing and expanded.

Referring to FIG. 9A, the electronic device 200 may provide a first screen 911 through a display area 910 before expansion. The display area 910 before expansion is in the state in which the display 310 is reduced to the minimum or a small amount so that only the display area having a first size is exposed to the outside, and the first size may correspond to the basic display area that is always exposed to the outside. If it is detected that the display area is expanded while providing the first screen 911, the electronic device 200 may identify that the left portion of the display 310 is gripped by the user and perform control to provide the first screen 911, based on the left portion of the expanded display 920 or 930 when the display area 910 is expanded. In FIG. 9A, the electronic device 200 may identify that the position where the first screen 911 is provided does not correspond to the drawing-out direction of the display 310 and shift the first screen 911 in the left direction in synchronization with a speed at which the display 310 is drawn out. As the first screen 911 is shifted in the expanding display area 920 while the display 310 is drawn out, a space 921 for providing a second screen for reception of a call notification may be gradually enlarged based on the right direction of the expanding display area 920. The expanding display area 920 may be in the state in which the display 310 in a fully reduced state is partially drawn out so that the display area having a second size is exposed to the outside. The electronic device 200 may maintain a blank state without displaying anything in the space 921 of the expanding display area 920 while the display 310 is drawn out. Thereafter, when the display 310 is completed drawn out, the electronic device 200 may provide a second screen 931 for reception of a call notification, based on the right portion of the expanded display area 930. The expanded display area 930 may be in the state in which the display 310 is drawn out of the housing so that the display area having a third size is exposed to the outside, and the third size may correspond to the maximally or a largely expanded display area.

Referring to FIG. 9B, the electronic device 200 may provide a first screen 911 through the display area 910 before expansion. If it is detected that the display area is expanded while providing the first screen 911, the electronic device 200 may identify that the left portion of the display 310 is gripped by the user and perform control to provide the first screen 911, based on the left portion of the expanded display 920 or 930 when the display area 910 is expanded. In FIG. 9B, the electronic device 200 may identify that the position where the first screen 911 is provided does not correspond to the drawing-out direction of the display 310 and shift the first screen 911 in the left direction in synchronization with a speed at which the display 310 is drawn out. As the first screen 911 is shifted in the expanding display area 920 while the display 310 is drawn out, a space 922 for providing a second screen may be gradually enlarged based on the right direction of the expanding display area 920. The electronic device 200 may gradually display a second screen 932 to conform to the size of the space 922 in the expanding display area 920 while the display 310 is drawn out. In this case, the second screen 932 may be partially exposed, instead of being exposed at once, depending on the extent to which the display 310 is drawn out. Thereafter, when the display 310 is completed drawn out, the electronic device 200 may display the entire second screen 932, based on the right portion of the expanded display area 930.

Referring to FIG. 9C, the electronic device 200 may provide a first screen 911 through the display area 910 before expansion. If it is detected that the display area is expanded while providing the first screen 911, the electronic device 200 may identify that the left portion of the display 310 is gripped by the user and perform control to provide the first screen 911, based on the left portion of the expanded display 920 or 930 when the display area 910 is expanded. In FIG. 9C, the electronic device 200 may identify that the position where the first screen 911 is provided does not correspond to the drawing-out direction of the display 310 and shift the first screen 911 in the left direction in synchronization with a speed at which the display 310 is drawn out. As the first screen 911 is shifted in the expanding display area 920 while the display 310 is drawn out, a space 923 for providing a second screen may be gradually enlarged based on the right direction of the expanding display area 920. The electronic device 200 may adjust the size of the content (e.g., icons or text) included in the second screen 933 to conform to the size of the space 923 in the expanding display area 920 while the display 310 is drawn out and then display the same. In this case, the content included in the second screen 933 may be displayed in a size reduced by a predetermined percentage depending on the extent to which the display 310 is drawn out, and the size of the content may be gradually enlarged to conform to the size of the space 923. Thereafter, when the display 310 is completed drawn out, the electronic device 200 may display the second screen 933 including content having a maximally enlarged or a large size, based on the right portion of the expanded display area 930. Accordingly, even if a call notification is received while providing a video through the first screen 911, the electronic device 200 may provide reception of the call notification through the second screen 933 of the expanded display area 930 without disturbing the user watching the video.

Figure 10A:
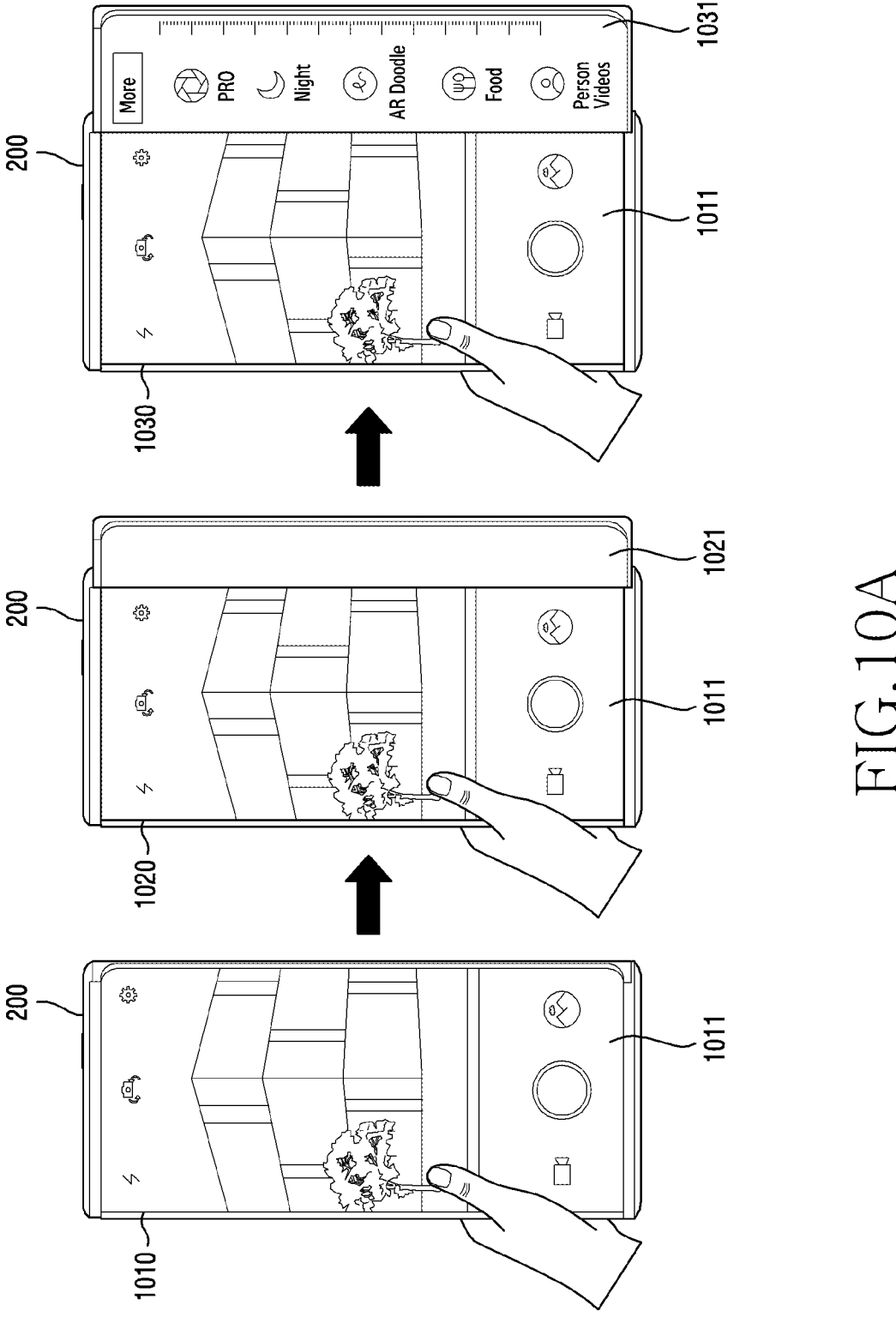
FIGS. 10A, 10B, and 10C are diagrams illustrating a method of further providing a second screen in response to an event detected during execution of a camera application according to an example embodiment.
Figure 10B:
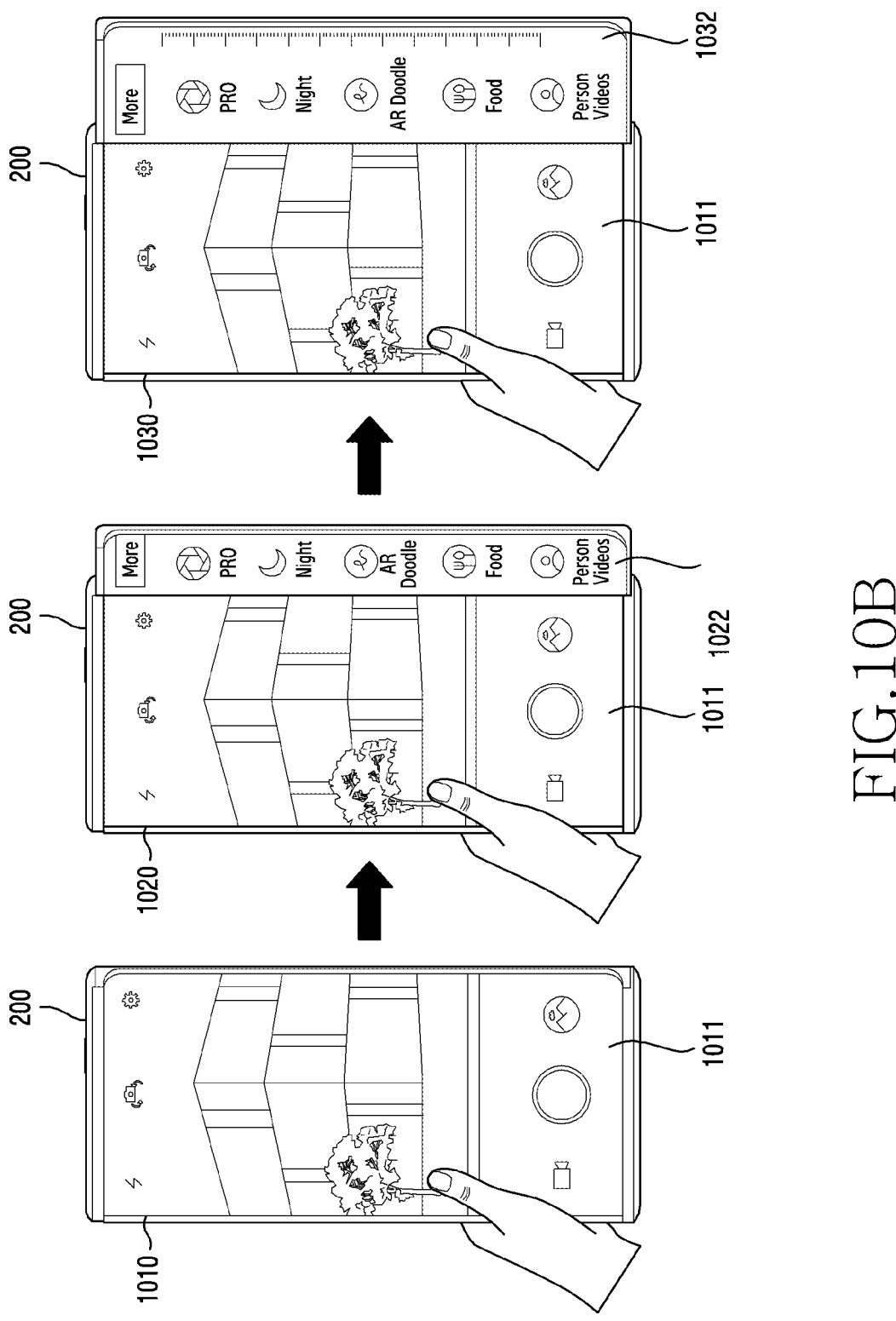
Figure 10C:
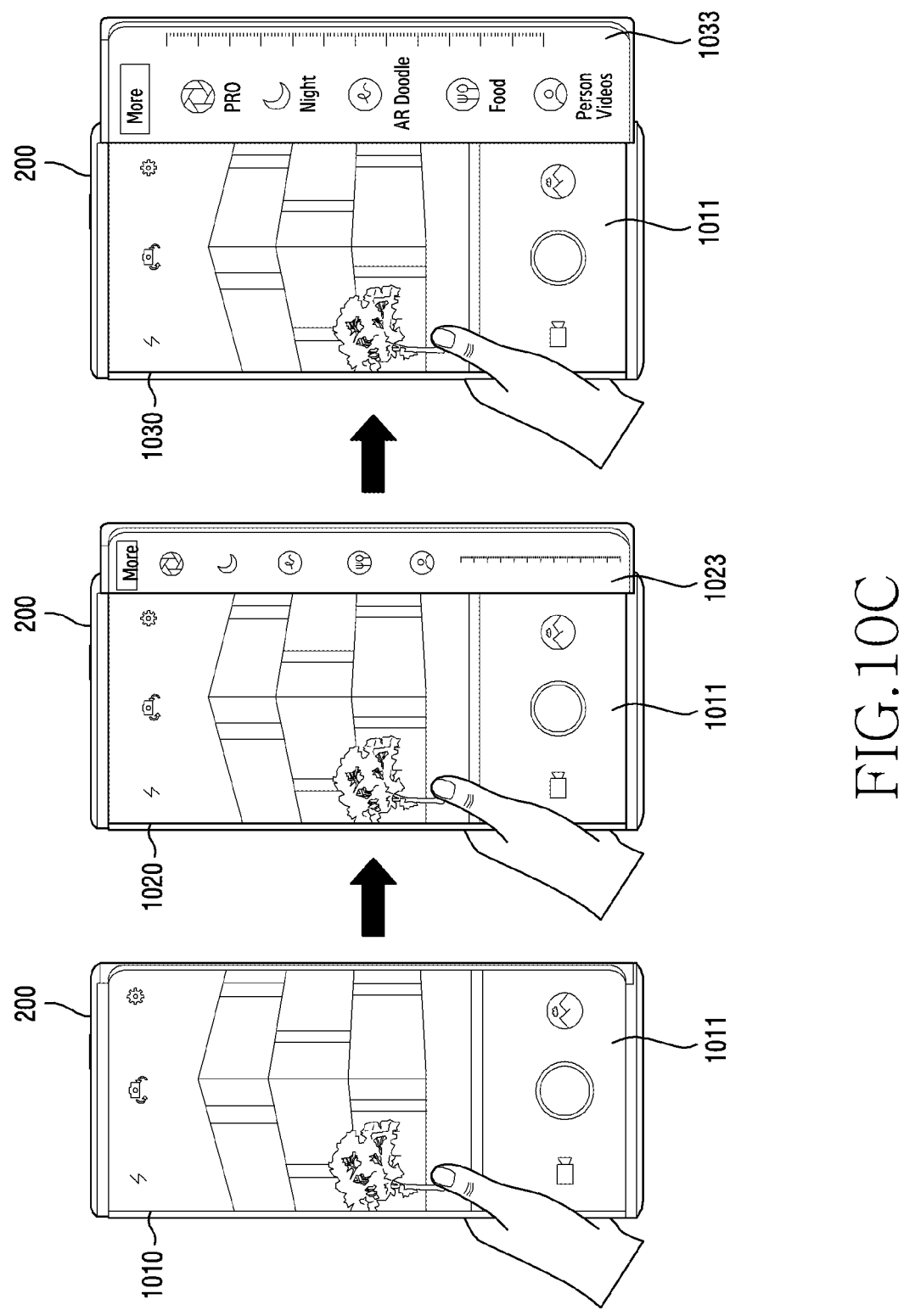

FIGS. 10A, 10B, and 10C are diagrams illustrating a method of further providing a second screen in response to an event detected during execution of a camera application according to an embodiment. According to various embodiments, the electronic device 200 may detect that a specified event occurs while providing a first screen 1011 by executing a camera application. For example, the first screen 1011 may include an execution screen of the camera application, and the specified event may be a user input for configuring a function of the camera application. If the user input is detected while executing the camera application, the electronic device 200 may produce a second screen including a menu related to the function configuration of the camera application and provide the second screen when the display area is expanded. The display area may be automatically expanded when a specified event occurs or may be expanded by a specified operation performed by the user (e.g., a rolling-out operation or a sliding-out operation). According to various embodiments, the electronic device 200 may identify that a roller for rolling or unrolling at least a portion of a display (e.g., the display module 160 in FIG. 1 or the display 310 in FIG. 3) is positioned on the left side of the display 310 and identify that the display 310 is drawn out in the right direction by the roller while the display area is expanded. The electronic device 200 may provide the second screen differently depending on the size of the display area of the display 310 that is drawn out of the housing and expanded.

Referring to FIG. 10A, the electronic device 200 may provide a first screen 1011 through the display area 1010 before expansion. The display area 1010 before expansion is in the state in which the display 310 is reduced to the minimum or a small amount so that only the display area having a first size is exposed to the outside, and the first size may correspond to the basic display area that is always exposed to the outside. If it is detected that the display area is expanded while providing the first screen 1011, the electronic device 200 may identify that the left portion of the display 310 is gripped by the user and perform control to provide the first screen 1011, based on the left portion of the expanded display 1020 or 1030 when the display area 1010 is expanded. In FIG. 10A, the electronic device 200 may identify that the position where the first screen 1011 is provided does not correspond to the drawing-out direction of the display 310 and shift the first screen 1011 in the left direction in synchronization with a speed at which the display 310 is drawn out. As the first screen 1011 is shifted in the expanding display area 1020 while the display 310 is drawn out, a space 1021 for providing a second screen including a menu for configuring functions of the camera application may be gradually enlarged based on the right direction of the expanding display area 1020. The expanding display area 1020 may be in the state in which the display 310 in a fully reduced state is partially drawn out so that the display area having a second size is exposed to the outside. The electronic device 200 may maintain a blank state without displaying anything in the space 1021 of the expanding display area 1020 while the display 310 is drawn out. Thereafter, when the display 310 is completed drawn out, the electronic device 200 may provide a second screen 1031 including a menu for configuring functions of the camera application, based on the right portion of the expanded display area 1030. The expanded display area 1030 may be in the state in which the display 310 is drawn out of the housing so that the display area having a third size is exposed to the outside, and the third size may correspond to the maximally or large expanded display area.

Referring to FIG. 10B, the electronic device 200 may provide a first screen 1011 through the display area 1010 before expansion. If it is detected that the display area is expanded while providing the first screen 1011, the electronic device 200 may identify that the left portion of the display 310 is gripped by the user and perform control to provide the first screen 1011, based on the left portion of the expanded display 1020 or 1030 when the display area 1010 is expanded. In FIG. 10B, the electronic device 200 may identify that the position where the first screen 1011 is provided does not correspond to the drawing-out direction of the display 310 and shift the first screen 1011 in the left direction in synchronization with a speed at which the display 310 is drawn out. As the first screen 1011 is shifted in the expanding display area 1020 while the display 310 is drawn out, a space 1022 for providing a second screen may be gradually enlarged based on the right direction of the expanding display area 1020. The electronic device 200 may gradually display a second screen 1032 to conform to the size of the space 1022 in the expanding display area 1020 while the display 310 is drawn out. In this case, the second screen 1032 may be partially exposed, instead of being exposed at once, depending on the extent to which the display 310 is drawn out. Thereafter, when the display 310 is completed drawn out, the electronic device 200 may display the entire second screen 1032, based on the right portion of the expanded display area 1030.

Referring to FIG. 10C, the electronic device 200 may provide a first screen 1011 through the display area 1010 before expansion. If it is detected that the display area is expanded while providing the first screen 1011, the electronic device 200 may identify that the left portion of the display 310 is gripped by the user and perform control to provide the first screen 1011, based on the left portion of the expanded display 1020 or 1030 when the display area 1010 is expanded. In FIG. 10C, the electronic device 200 may identify that the position where the first screen 1011 is provided does not correspond to the drawing-out direction of the display 310 and shift the first screen 1011 in the left direction in synchronization with a speed at which the display 310 is drawn out. As the first screen 1011 is shifted in the expanding display area 1020 while the display 310 is drawn out, a space 1023 for providing a second screen may be gradually enlarged based on the right direction of the expanding display area 1020. The electronic device 200 may display a simplified menu for configuring functions of the camera application included in the second screen 1033 to conform to the size of the space 1023 in the expanding display area 1020 while the display 310 is drawn out. In this case, the configuration menu included in the second screen 1033 may be displayed in a simplified form (e.g., only icons are displayed without displaying text for one or more functions) or in a size reduced by a predetermined percentage depending on the extent to which the display 310 is drawn out, and the size of the configuration menu may be enlarged in stages to conform to the size of the space 1023. Thereafter, when the display 310 is completed drawn out, the electronic device 200 may display the second screen 1033 including a configuration menu having a maximally enlarged or large size, based on the right portion of the expanded display area 1030. Accordingly, the electronic device 200 may provide a menu for configuring camera functions in response to a user input without interfering with the camera view displayed through the first screen 1011.

Figure 11A:
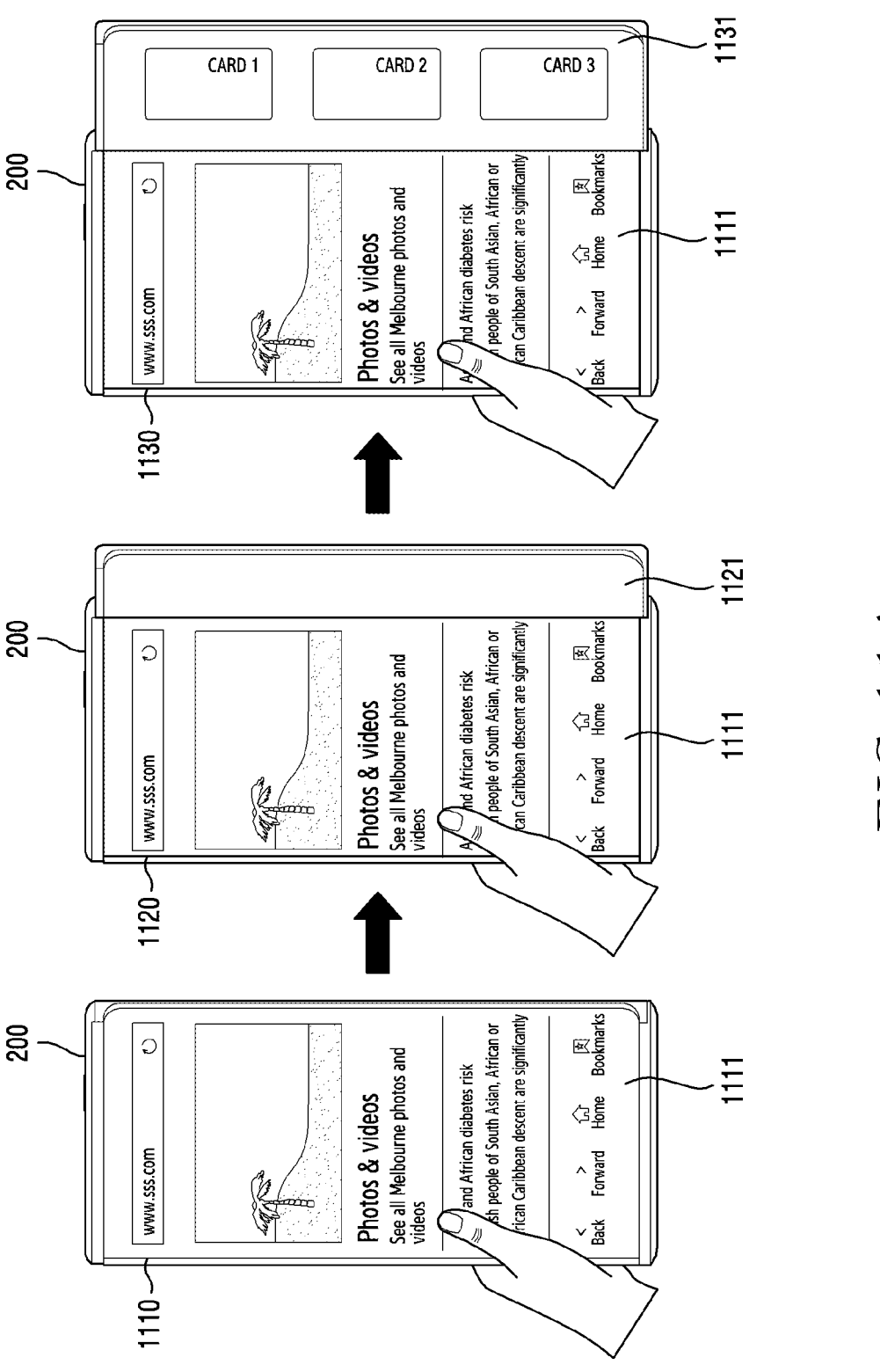
FIGS. 11A, 11B, and 11C are diagrams illustrating a method of further providing a second screen in response to an event detected during execution of a web browser application according to an example embodiment.
Figure 11B:
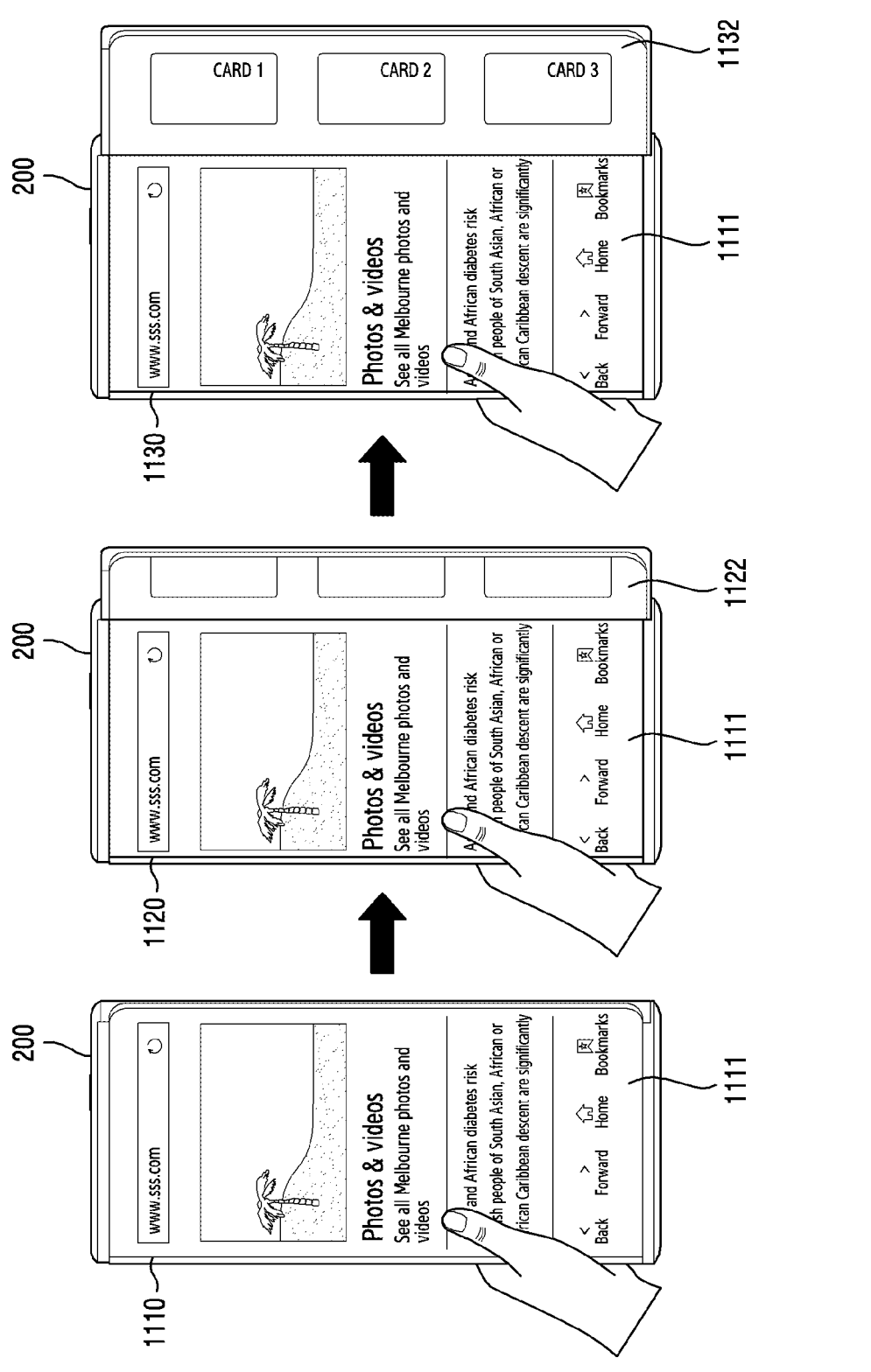
Figure 11C:
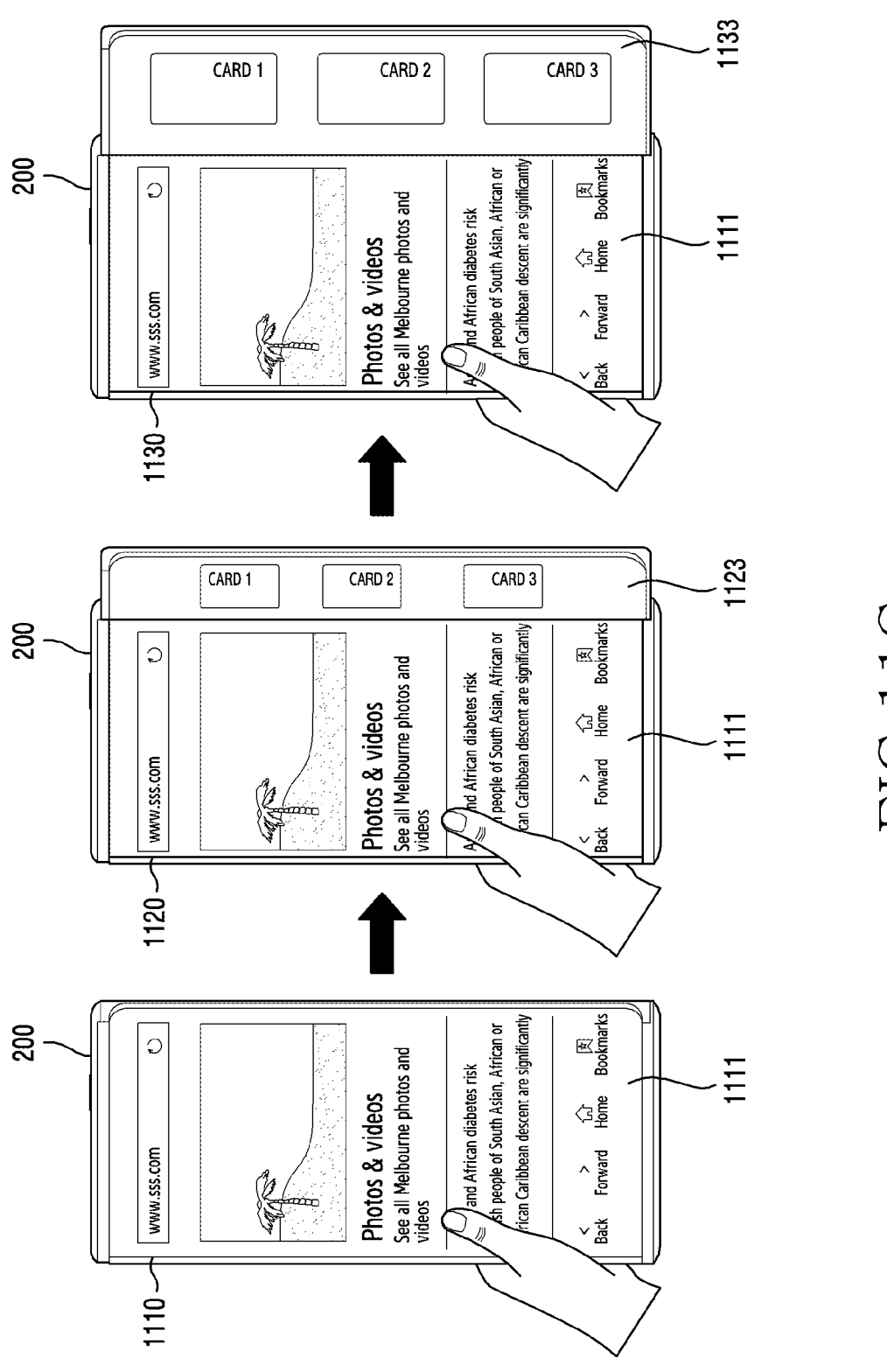

FIGS. 11A, 11B, and 11C are diagrams illustrating a method of further providing a second screen in response to an event detected during execution of a web browser application according to an embodiment. According to various embodiments, the electronic device 200 may detect that a specified event occurs while providing a first screen 1111 by executing a web browser application. For example, the first screen 1111 may include an execution screen of the web browser application, and the specified event may be a payment request received while displaying the web browser application. The electronic device 200 may produce a second screen for processing payment in response to reception of the payment request and provide the second screen when the display area is expanded. The display area may be automatically expanded when the specified event occurs or may be expanded by a specified operation performed by the user (e.g., a rolling-out operation or a sliding-out operation). According to various embodiments, the electronic device 200 may identify that a roller for rolling or unrolling at least a portion of a display (e.g., the display module 160 in FIG. 1 or the display 310 in FIG. 3) is positioned on the left side of the display 310 and identify that the display 310 is drawn out in the right direction by the roller while the display area is expanded. The electronic device 200 may provide the second screen differently depending on the size of the display area of the display 310 that is drawn out of the housing and expanded.

Referring to FIG. 11A, the electronic device 200 may provide a first screen 1111 through the display area 1110 before expansion. The display area 1110 before expansion is in the state in which the display 310 is reduced to the minimum or a small amount so that only the display area having a first size is exposed to the outside, and the first size may correspond to the basic display area that is always exposed to the outside. If it is detected that the display area is expanded while providing the first screen 1111, the electronic device 200 may identify that the left portion of the display 310 is gripped by the user and perform control to provide the first screen 1111, based on the left portion of the expanded display 1120 or 1130 when the display area 1110 is expanded. In FIG. 11A, the electronic device 200 may identify that the position where the first screen 1111 is provided does not correspond to the drawing-out direction of the display 310 and shift the first screen 1111 in the left direction in synchronization with a speed at which the display 310 is drawn out. As the first screen 1111 is shifted in the expanding display area 1120 while the display 310 is drawn out, a space 1121 for providing a second screen including one or more payment means may be gradually enlarged based on the right direction of the expanding display area 1120. The expanding display area 1120 may be in the state in which the display 310 in a fully reduced state is partially drawn out so that the display area having a second size is exposed to the outside. The electronic device 200 may maintain a blank state without displaying anything in the space 1121 of the expanding display area 1120 while the display 310 is drawn out. Thereafter, when the display 310 is completed drawn out, the electronic device 200 may provide a second screen 1131 including one or more payment means, based on the right portion of the expanded display area 1130. The expanded display area 1130 may be in the state in which the display 310 is drawn out of the housing so that the display area having a third size is exposed to the outside, and the third size may correspond to the maximally or highly expanded display area.

Referring to FIG. 11B, the electronic device 200 may provide a first screen 1111 through the display area 1110 before expansion. If it is detected that the display area is expanded while providing the first screen 1111, the electronic device 200 may identify that the left portion of the display 310 is gripped by the user and perform control to provide the first screen 1111, based on the left portion of the expanded display 1120 or 1130 when the display area 1110 is expanded. In FIG. 11B, the electronic device 200 may identify that the position where the first screen 1111 is provided does not correspond to the drawing-out direction of the display 310 and shift the first screen 1111 in the left direction in synchronization with a speed at which the display 310 is drawn out. As the first screen 1111 is shifted in the expanding display area 1120 while the display 310 is drawn out, a space 1122 for providing a second screen may be gradually enlarged based on the right direction of the expanding display area 1120. The electronic device 200 may gradually display a second screen 1132 to conform to the size of the space 1122 in the expanding display area 1120 while the display 310 is drawn out. In this case, the second screen 1132 may be partially exposed, instead of being exposed at once, depending on the extent to which the display 310 is drawn out. Thereafter, when the display 310 is completed drawn out, the electronic device 200 may display the entire second screen 1132, based on the right portion of the expanded display area 1130.

Referring to FIG. 11C, the electronic device 200 may provide a first screen 1111 through the display area 1110 before expansion. If it is detected that the display area is expanded while providing the first screen 1111, the electronic device 200 may identify that the left portion of the display 310 is gripped by the user and perform control to provide the first screen 1111, based on the left portion of the expanded display 1120 or 1130 when the display area 1110 is expanded. In FIG. 11C, the electronic device 200 may identify that the position where the first screen 1111 is provided does not correspond to the drawing-out direction of the display 310 and shift the first screen 1111 in the left direction in synchronization with a speed at which the display 310 is drawn out. As the first screen 1111 is shifted in the expanding display area 1120 while the display 310 is drawn out, a space 1123 for providing a second screen may be gradually enlarged based on the right direction of the expanding display area 1120. The electronic device 200 may adjust the sizes of one or more payment means included in the second screen 1133 to conform to the size of the space 1123 in the expanding display area 1120 while the display 310 is drawn out and then display the same. In this case, one or more payment means included in the second screen 1133 may be displayed in a size reduced by a predetermined percentage depending on the extent to which the display 310 is drawn out, and the size of the one or more payment means may be enlarged in stages to conform to the size of the space 1123. Thereafter, when the display 310 is completed drawn out, the electronic device 200 may provide the second screen 1133 such that the one or more payment means are displayed in a maximally or highly enlarged size, based on the right portion of the expanded display area 1130. Accordingly, the electronic device 200 may process payment using one or more payment means provided through the second screen 1133 without interfering with the content provided through the first screen 1111 while using the web browser application.

Figure 12A:
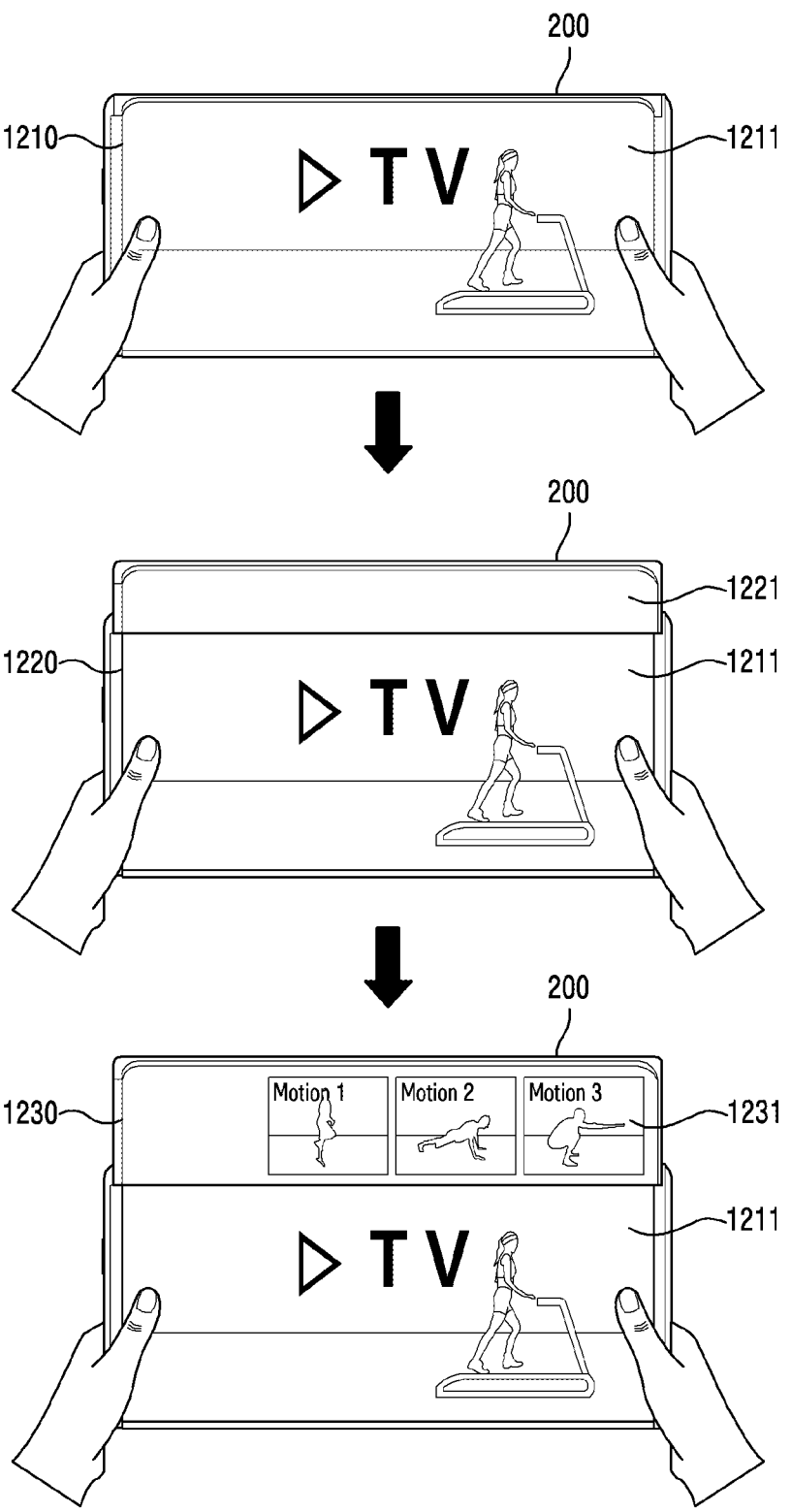
FIGS. 12A, 12B, and 12C are diagrams illustrating a method of further providing a second screen in response to an event detected while an electronic device operates in a landscape mode according to an example embodiment.
Figure 12B:
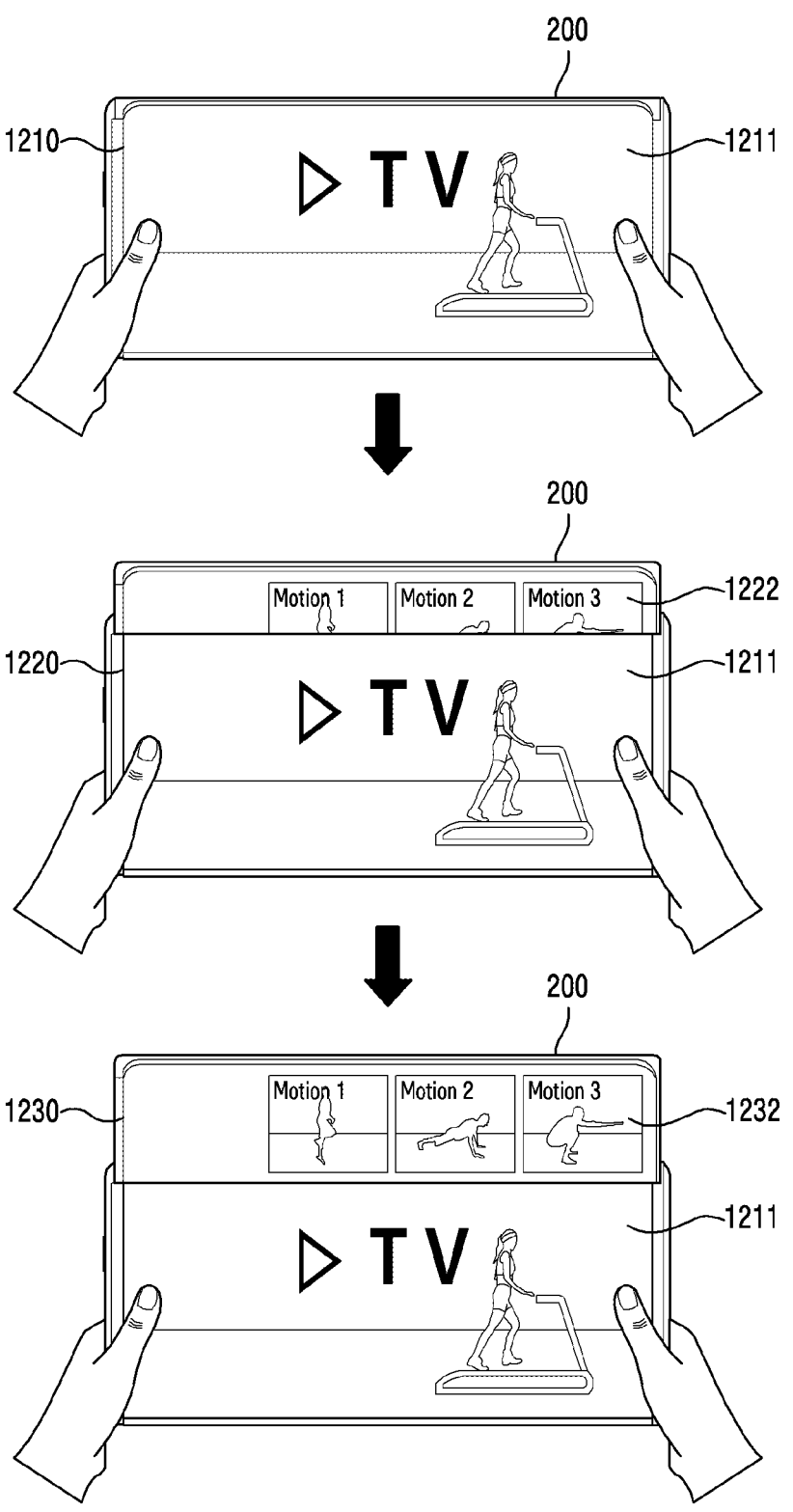
Figure 12C:
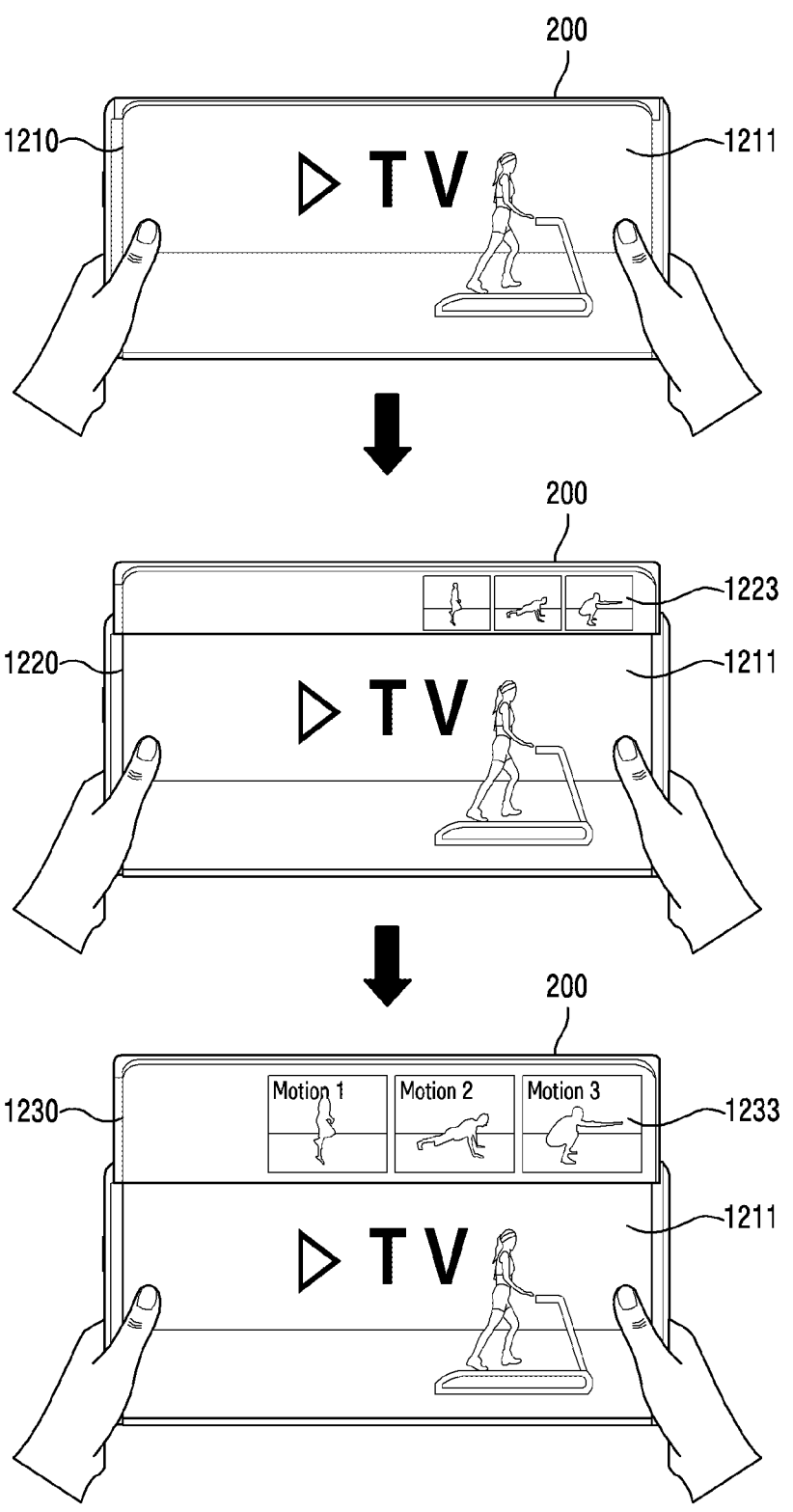

FIGS. 12A, 12B, and 12C are diagrams illustrating a method of further providing a second screen in response to an event detected while an electronic device operates in a landscape mode according to an embodiment. According to various embodiments, the electronic device 200 may detect that a specified event occurs while providing a first screen 1211 by executing a video application in the state in which the screen direction of a display (e.g., the display module 160 in FIG. 1 or the display 310 in FIG. 3) is a horizontal direction (or transverse direction). For example, the first screen 1211 may include an execution screen of the video application, and the specified event may be a user input for displaying a preview frame of video content provided through the video application. If the user input is detected while the video application is running, the electronic device 200 may produce a second screen including preview frames of the video content, and provide the second screen when the display area is expanded. The display area may be automatically expanded when the specified event occurs or may be expanded by a specified operation performed by the user (e.g., a rolling-out operation or a sliding-out operation). According to various embodiments, the electronic device 200 may provide the second screen differently depending on the size of the display area of the display 310 that is drawn out of the housing and expanded.

Referring to FIG. 12A, the electronic device 200 may provide a first screen 1211 through the display area 1210 before expansion. The display area 1210 before expansion is in the state in which the display 310 is reduced to the minimum or a small degree so that only the display area having a first size is exposed to the outside, and the first size may correspond to the basic display area that is always exposed to the outside. If it is detected that the display area is expanded while providing the first screen 1211, the electronic device 200 may perform control to provide the first screen 1211, based on the lower portion of the expanded display 1220 or 1230 when the display area 1210 is expanded. In FIG. 12A, while the display 310 is drawn out, a space 1221 for providing a second screen including preview frames of video content may be gradually enlarged based on the upper direction of the expanding display area 1220. The expanding display area 1220 may be in the state in which the display 310 in a fully reduced state is partially drawn out so that the display area having a second size is exposed to the outside. The electronic device 200 may maintain a blank state without displaying anything in the space 1221 of the expanding display area 1220 while the display 310 is drawn out. Thereafter, when the display 310 is completed drawn out, the electronic device 200 may provide a second screen 1231 including preview frames of video content, based on the upper portion of the expanded display area 1230. The expanded display area 1230 may be in the state in which the display 310 is drawn out of the housing so that the display area having a third size is exposed to the outside, and the third size may correspond to the maximally or highly expanded display area.

Referring to FIG. 12B, the electronic device 200 may provide a first screen 1211 through the display area 1210 before the electronic device 200 is expanded. If it is detected that the display area is expanded while providing the first screen 1211, the electronic device 200 may perform control to provide the first screen 1211, based on the lower portion of the expanded display 1220 or 1230 when the display area 1210 is expanded. In FIG. 12B, while the display 310 is drawn out, a space 1222 for providing a second screen may be gradually enlarged based on the upper direction of the expanding display area 1220. The electronic device 200 may gradually display a second screen 1232 to conform to the size of the space 1222 in the expanding display area 1220 while the display 310 is drawn out. In this case, the second screen 1232 may be partially exposed, instead of being exposed at once, depending on the extent to which the display 310 is drawn out. Thereafter, when the display 310 is completed drawn out, the electronic device 200 may display the entire second screen 1232, based on the upper portion of the expanded display area 1230.

Referring to FIG. 12C, the electronic device 200 may provide a first screen 1211 through the display area 1210 before the electronic device 200 is expanded. If it is detected that the display area is expanded while providing the first screen 1211, the electronic device 200 may perform control to provide the first screen 1211, based on the lower portion of the expanded display 1220 or 1230 when the display area 1210 is expanded. In FIG. 12C, while the display 310 is drawn out, a space 1223 for providing a second screen may be gradually enlarged based on the upper direction of the expanding display area 1220. The electronic device 200 may adjust the sizes of the preview frames of video content included in the second screen 1233 to conform to the size of the space 1223 in the expanding display area 1220 while the display 310 is being drawn out and then display the same. In this case, the preview frames of video content included in the second screen 1233 may be displayed in a size reduced by a predetermined percentage depending on the extent to which the display 310 is drawn out, and the sizes of the preview frames may be enlarged in stages to conform to the size of the space 1223. Thereafter, when the display 310 is completed drawn out, the electronic device 200 may display the second screen 1233 including preview frames having maximally or highly enlarged sizes, based on the upper portion of the expanded display area 1230. Accordingly, the electronic device 200 may display preview frames of video content in response to a user input without interfering with the video content provided through the first screen 1211.

Figure 13A:
FIGS. 13A and 13B are diagrams illustrating a method of providing at least one second screen at a display position specified by a user according to an example embodiment.
Figure 13B:
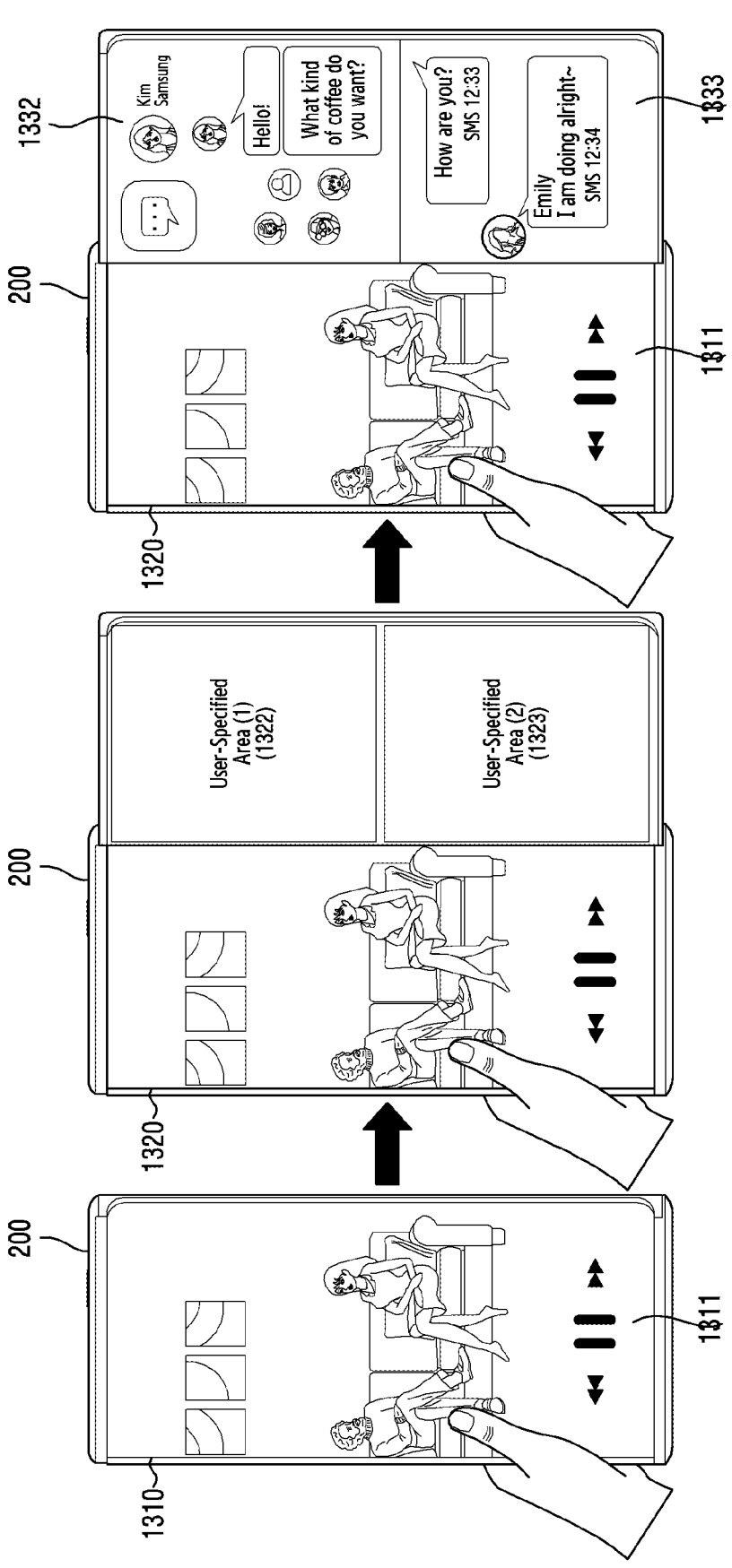

FIGS. 13A and 13B are diagrams illustrating a method of providing at least one second screen at a display position specified by a user according to an embodiment. According to various embodiments, in the process of providing a second screen in response to an event detected while providing a first screen 1311, the electronic device 200 may obtain a user input for specifying a display position of the second screen. The first screen 1311 may include an execution screen of a video application, and the event may include at least one of call notification, message reception, application-related reception, or user input. For example, the electronic device 200 may detect a touch input for specifying a position where at least one second screen is to be displayed in the expanded display area 1320 while the display area is expanded (or after the display area is expanded) in response to detection of the event, and provide the at least one second screen, based on a position where the touch input is detected. As another example, the electronic device 200 may pre-specify a display position for at least one second screen through a configuration menu or provide an identification message regarding a display position of the at least second screen when the display area is expanded, thereby obtaining the user input.

Referring to FIG. 13A, the electronic device 200 may provide a first screen 1311 through the display area 1310 before expansion. If it is detected that the display area is expanded while providing the first screen 1311, the electronic device 200 may identify a user-specified area 1321 in the expanded display area 1320. For example, the user-specified area 1321 may be determined based on a position where the user's touch input is detected while the display area is expanded (or after it is expanded) or may be determined based on a user input to the configuration menu or a message provided when the display area is expanded. In FIG. 13A, the electronic device 200 may identify the right portion of the expanded display area 1320 as the user-specified area 1321, and display a second screen 1331 on the identified user-specified area 1321. The second screen 1331 may include a chat message of a messenger application received while providing the first screen 1311. According to various embodiments, the electronic device 200 may identify a position corresponding to the direction of gripped portion by the user in the expanded display area 1320 as the user-specified area 1321. For example, when the left portion of the expanded display area is identified as the user-specified area 1321 in the state in which the left portion is gripped, the electronic device 200 may shift the first screen 1311 in the right direction in synchronization with a speed at which the display 310 is drawn out and display the second screen 1331 on the user-specified area 1321 in the left portion.

According to various embodiments, if it is detected a plurality of events while providing the first screen 1311, the electronic device 200 may divide the user-specified area 1321 into a plurality of areas and provide the second screen. Referring to FIG. 13B, the electronic device 200 may identify that chat messages of a messenger application and SMS messages are simultaneously or sequentially received while the first screen 1311 is provided through the display area 1310 before expansion. The electronic device 200 may divide the right portion of the expanded display area 1320 specified by the user into two areas and identify the divided two areas as a user-specified area 1 (1322) and a user-specified area 2 (1323), respectively. The electronic device 200 may provide a second screen-1 (1332) including chat messages of a messenger application on the user-specified area 1 (1322) and provide a second screen-2 (1333) including SMS messages on the user-specified area 2 (1323). According to various embodiments, the electronic device 200 may divide a user-specified area into a plurality of areas in response to the number of events detected while providing the first screen 1311, and the size of each divided area may be determined in consideration of the type of event or application related to the second screen provided through each area.

Figure 14A:
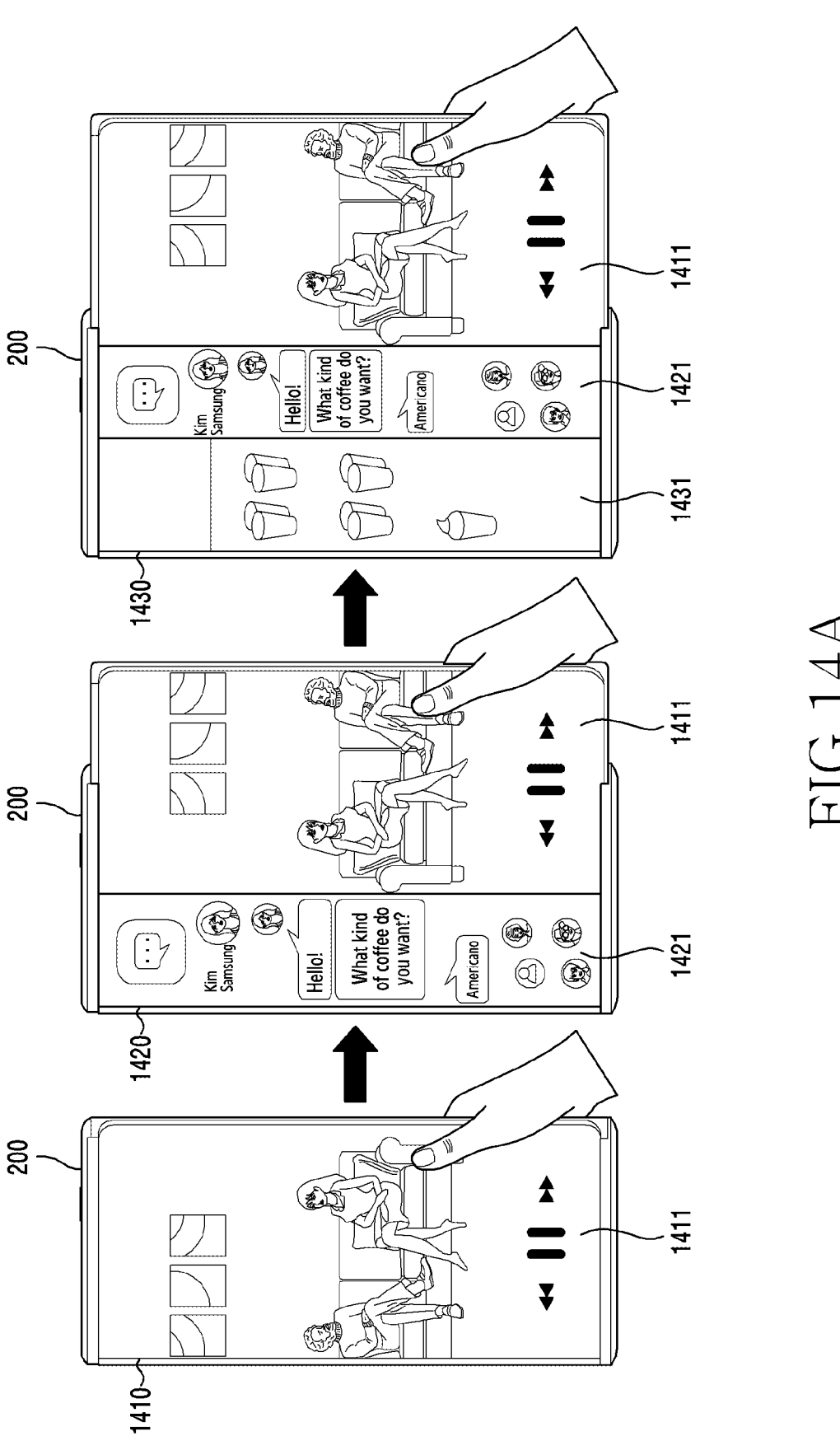
FIGS. 14A and 14B are diagrams illustrating a method of providing one or more second screens in response to occurrence of one or more events detected while an application is running according to an example embodiment.
Figure 14B:
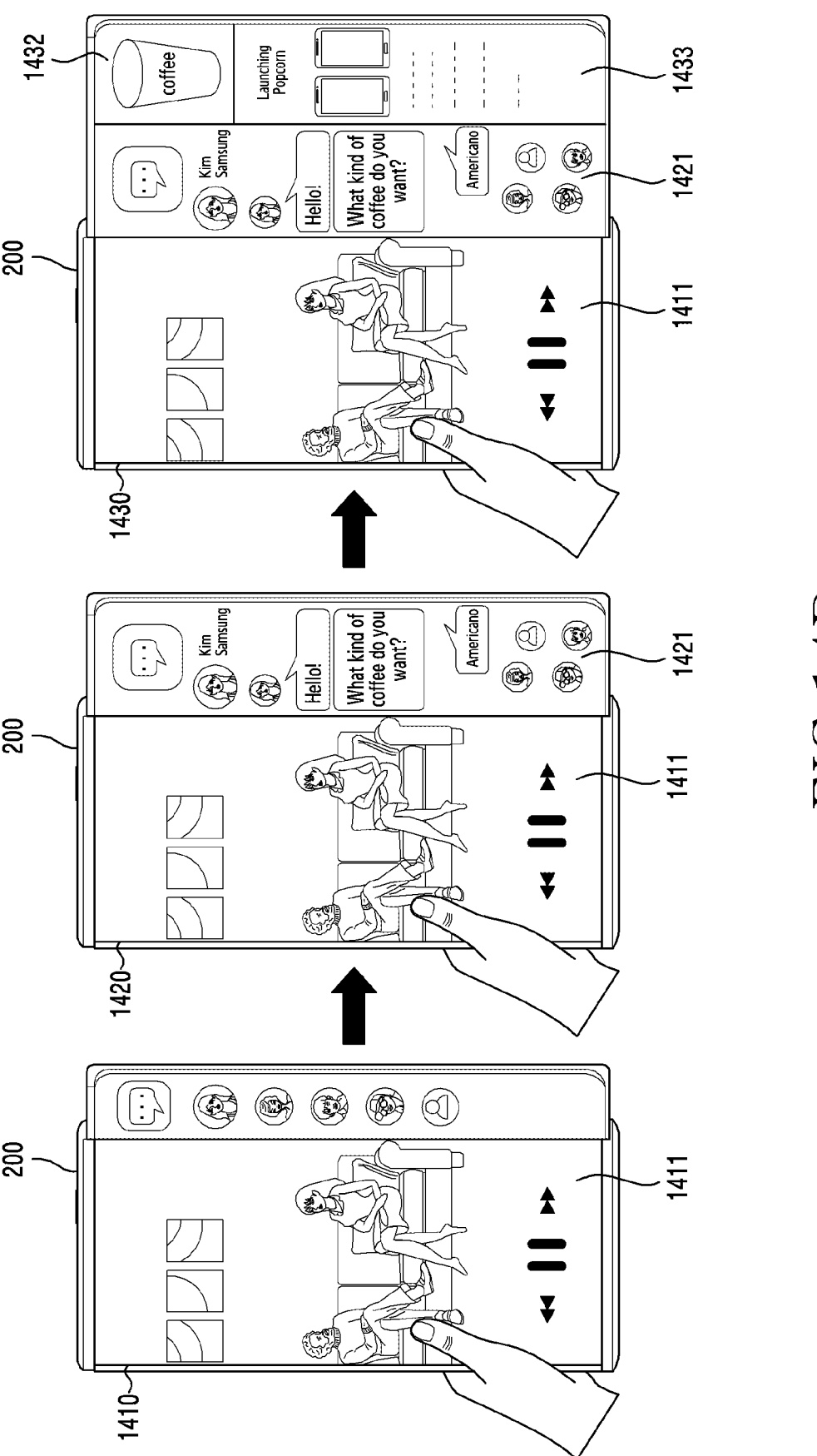

FIGS. 14A and 14B are diagrams illustrating a method of providing one or more second screens in response to occurrence of one or more events detected while an application is running according to an embodiment. According to various embodiments, the electronic device 200 may detect that a first event occurs while providing a first screen 1411 by executing a video application. For example, the first screen 1411 may include an execution screen of the video application, and the first event may be a chat message of a messenger application received while the video application is running. The electronic device 200 may produce a second screen 1421 for replying to the message in response to reception of the chat message and provide the second screen when the display area is expanded. Thereafter, the electronic device 200 may detect one or more second events that further occur while the first screen 1411 and the second screen 1421 are provided. The second events may include a user's touch input (e.g., selecting link information or executing a new application) detected through the first screen 1411 or the second screen 1421, a notification message produced following the first event, or information related thereto. The electronic device 200 may produce one or more third screens corresponding to the one or more second events and provide the third screens by further expanding the display area. The one or more third screens may be produced to correspond to the number of the second events.

Referring to FIG. 14A, the electronic device 200 may provide a first screen 1411 through the display area 1410 before expansion. The display area 1410 before expansion is in the state in which the display 310 is reduced to the minimum or small degree so that only the display area having a first size is exposed to the outside, and the first size may correspond to the basic display area that is always exposed to the outside. The electronic device 200 may detect that the display area is expanded to a second size, based on the first event while providing the first screen 1411. The electronic device 200 may identify that the right portion of the display 1420 expanded to the second size is gripped by the user and perform control to provide the first screen 1411, based on the right portion. The electronic device 200 may provide a second screen 1421 for receiving a chat message, based on the left portion of the display 1420 expanded to the second size. Thereafter, the electronic device 200 may detect that the display area is further expanded to a third size in response to the second events that further occur while the first screen 1411 and the second screen 1421 are provided. The electronic device 200 may perform control to provide the one or more third screens 1431, based on the left portion of the display 1430 expanded to the third size. In this process, the electronic device 200 may divide the left portion into a plurality of areas corresponding to the number of the second events and provide the one or more third screens 1431 through the divided areas. According to various embodiments, if the electronic device 200 detects an event that further occurs in the state in which the display 310 is maximally or highly drawn out, the electronic device 200 may further divide the most recently expanded display area to provide information on the additional event.

Referring to FIG. 14B, the electronic device 200 may detect that the display area having a first size is expanded to a second size, based on a first event while providing a first screen 1411 through the display area. The electronic device 200 may determine that the left portion of the display 1420 expanded to the second size is gripped by the user and may perform control to provide the first screen 1411, based on the left portion. In FIG. 14B, the electronic device 200 may identify that the position where the first screen 1411 is provided does not correspond to the drawing-out direction of the display 310 and shift the first screen 1411 in the left direction in synchronization with a speed at which the display 310 is drawn out. The electronic device 200 may provide the first screen 1411, based on the left portion of the display 1420 expanded to the second size, and provide a second screen 1421 for receiving a chat message, based on the right portion thereof. Thereafter, the electronic device 200 may detect that the display area is further expanded to a third size in response to second events that further occur while the first screen 1411 and the second screen 1421 are provided. As the display area is further expanded to the third size, the electronic device 200 may shift the first screen 1411 and the second screen 1421 in the left direction in synchronization with a speed at which the display 310 is drawn out and perform control to provide the one or more third screens 1432 and 1433 to the right portion of the display area expanded to the third size. The electronic device 200 may divide the left portion into a plurality of areas corresponding to the number of the second events and provide the one or more third screens 1432 and 1433 through the divided areas.

An electronic device (e.g., the electronic device 200) according to an embodiment may include a housing, a display (e.g., the display 310) configured to be received inside the housing, at least one processor (e.g., the processor 320) operatively connected to the display, and a memory (e.g., the memory 330) operatively coupled to the at least one processor, wherein the memory may store instructions that, when executed, cause the at least one processor, if the display is detected to be expanded from the housing while providing a first screen, to identify a user's grip state, to determine a first area in which the first screen is displayed when the display is expanded based on the identified grip state, to identify whether or not the determined first area corresponds to a drawing-out direction of the display, and if the first area corresponds to the drawing-out direction of the display, to display a second screen, which is separated from the first screen, on a display area drawn out of the housing.

In an embodiment, the instructions may cause the at least one processor, if the first area is identified to not correspond to the drawing-out direction of the display, to move the first screen to the first area and display the first screen on a display area drawn out of the housing.

In an embodiment, the instructions may cause the at least one processor to shift the first screen to the first area in synchronization with a speed at which the display is drawn out of the housing.

In an embodiment, the instructions may cause the at least one processor to detect at least one event while providing the first screen, produce at least one second screen including information related to the at least one event, and display the at least one second screen on a second area, which is separated from the first area, in an expanded display when the display is expanded from the housing.

In an embodiment, the event may include at least one of phone notification, message reception, application-related notification reception, or user input. In an embodiment, the instructions may cause the at least one processor to detect a user input indicating a display position for the at least one second screen after the display is expanded from the housing, and display the at least one second screen, based on the user input.

In an embodiment, the instructions may cause the at least one processor to identify a screen direction exposed through the display, based on the user's grip state, and determine the first area in which the first screen is displayed through the expanded display, based on the identified screen direction.

In an embodiment, the instructions may cause the at least one processor to determine the first area, based on a lower area of the expanded display, if the screen direction is identified to be a horizontal direction.

In an embodiment, the instructions cause the at least one processor to identify a grip position, based on the user's grip state, if the screen direction is identified to be a vertical direction, and determine the first area, based on the identified grip position.

In an embodiment, the instructions may cause the at least one processor to identify a mainly used direction configured by the user and determine the grip position, based on the identified mainly used direction.

In an embodiment, the electronic device may further include one or more sensors (e.g., the sensor module 411 including sensing circuitry), and the instructions may cause the at least one processor to determine the grip position, based on data sensed by the one or more sensors.

In an embodiment, the instructions may cause the at least one processor to display the second screen on the expanded display after the display is completely drawn out.

In an embodiment, the instructions may cause the at least one processor to gradually display the second screen to conform to the size of the display area while the display is expanded by drawing out the display.

In an embodiment, the instructions may cause the at least one processor to adjust the size of content included in the second screen to conform to the size of the display area while the display is expanded by drawing out the display.

A method of operating an electronic device (e.g., the electronic device 200) according to another embodiment may include, if a display is detected to be expanded from a housing while providing a first screen, identifying a user's grip state, determining a first area in which the first screen is displayed when the display is expanded based on the identified grip state, identifying whether or not the determined first area corresponds to a drawing-out direction of the display, and if the first area corresponds to the drawing-out direction of the display, displaying a second screen, which is separated from the first screen, on a display area drawn out of the housing.

In an embodiment, the method may further include, if the first area does not correspond to the drawing-out direction of the display, shifting the first screen to the first area in synchronization with a speed at which the display is drawn out of the housing, and displaying the first screen on a display area drawn out of the housing.

In an embodiment, the method may further include detecting at least one event while providing the first screen, producing at least one second screen including information related to the at least one event, and displaying the at least one second screen on a second area, which is separated from the first area, in an expanded display when the display is expanded from the housing, and the event may include at least one of phone notification, message reception, application-related notification reception, or user input.

In an embodiment, the method may further include detecting a user input indicating a display position for the at least one second screen after the display is expanded from the housing and displaying the at least one second screen, based on the user input.

In an embodiment, the determining of the first area may include identifying a screen direction exposed through the display, based on the user's grip state, and determining the first area, based on a lower area of an expanded display, if the identified screen direction is a horizontal direction.

In an embodiment, the determining of the first area may include identifying a grip position, based on the user's grip state, if the identified screen direction is a vertical direction and determining the first area, based on the identified grip position.

In an embodiment, the identifying of the grip position may include determining the grip position, based on a mainly used direction configured by the user or data sensed by one or more sensors.

In an embodiment, the method may further include displaying the second screen on an expanded display after the display is completely drawn out, gradually displaying the second screen to conform to the size of the display area while the display is expanded by drawing out the display, and adjusting the size of content included in the second screen to conform to the size of the display area and displaying the same while the display is expanded by drawing out the display.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server. According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added.

Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
a housing;
a display configured to be received inside the housing;
at least one processor comprising processing circuitry; and memory storing instructions that, when executed by the at least one processor individually and/or collectively, cause the electronic device to:

based on detecting that the display is expanded from the housing while providing a first screen of an application, identify a screen direction displayed through the display;

based on the screen direction corresponding to a portrait mode, determine a first area in which the first screen is displayed based on a position touched by a grip;

detect at least one event while providing the first screen;

when a position of the first area within the expanded display area corresponds to a drawing-out direction of the display, display a second screen of another application, which is separated from the first screen, on a display area drawn out of the housing; and when the position of the first area within the expanded display area does not correspond to the drawing-out direction of the display, move the first screen to the first area and display the first screen on the display area drawn out of the housing;

based on the screen direction corresponding to a landscape mode, display the first screen based on a lower portion of the expanded display area and display the second screen of the other application based on an upper portion of the expanded display area;

adjust the size of content included in the second screen to conform to the size of a second area, which is separated from the first area, while the display is expanded by drawing out the display, wherein second screen is provided at a location opposite a detected user grip position.

2. The electronic device of claim 1, wherein the instructions, when executed by the at least one processor, cause the electronic device to, based on both hands being used, use a grip of the hand having a higher gripping.

3. The electronic device of claim 1, wherein the instructions, when executed by the at least one processor, cause the electronic device to shift the first screen to the first area in synchronization with a speed at which the display is drawn out of the housing.

4. The electronic device of claim 1, wherein the instructions, when executed by the at least one processor, cause the electronic device to:

generate at least one second screen comprising information related to the at least one event, and wherein the event comprises at least one of: phone notification, message reception, application-related notification reception, or user input.

5. The electronic device of claim 4, wherein the instructions, when executed by the at least one processor, cause the electronic device to:

detect a user input indicating a display position for the at least one second screen after the display is expanded from the housing, and display the at least one second screen, based on the user input.

6. The electronic device of claim 1, wherein the grip is a single hand grip.

7. The electronic device of claim 1, comprising a grip sensor, a touch sensor, and a pressure sensor wherein the instructions, when executed by the at least one processor, cause the electronic device to determine position touched by the grip based on data received from the grip sensor, the touch sensor, and the pressure sensor.

8. The electronic device of claim 1, wherein the second screen includes information related to an event that occurred before the display is detected to be expanded.

9. The electronic device of claim 8, wherein the event includes at least one of phone notification, message reception, application-related notification reception, or user input.

10. The electronic device of claim 1, further comprising one or more sensors, wherein the instructions, when executed by the at least one processor, cause the electronic device to determine the grip position, based on data sensed by the one or more sensors.

11. The electronic device of claim 4, wherein the instructions, when executed by the at least one processor, cause the electronic device to display the second screen on the second area, which is separated from the first area, in an expanded display after the display is completely drawn out.

12. The electronic device of claim 1, wherein the instructions, when executed by the at least one processor, cause the electronic device to gradually display the second screen to conform to the size of the second area, which is separated from the first area, while the display is expanded by drawing out the display.

13. The electronic device of claim 1, wherein the application of the first screen is a video application, and the instructions, when executed by the at least one processor, cause the electronic device to:

detect the at least one event while providing video playback in the first screen, generate the second screen comprising information related to the at least one event, and wherein the event comprises at least one of: phone notification, message reception, or application-related notification reception.

14. The electronic device of claim 1, wherein the application of the first screen is a video application, and the instructions, when executed by the at least one processor, cause the electronic device to:

detect a user input for displaying a preview frame of video content provided in the first screen, generate the second screen comprising preview frames of the video content.

15. A method of operating an electronic device, the method comprising:

based on detecting that a display is expanded from a housing while providing a first screen of an application, identifying a screen direction displayed through the display;

based on the screen direction corresponding to a portrait mode, determining a first area in which the first screen is displayed based on a position touched by a grip;

detecting at least one event while providing the first screen;

based on a position of the first area within the expanded display area corresponds to a drawing-out direction of the display, displaying a second screen of another application, which is separated from the first screen, on a display area drawn out of the housing; and based on the position of the first area within the expanded display area does not correspond to the drawing-out direction of the display, moving the first screen to the first area and displaying the first screen on the display area drawn out of the housing;

based on the screen direction corresponding to a landscape mode, displaying the first screen based on a lower portion of the expanded display area and display the second screen of the other application based on an upper portion of the expanded display area; and adjusting the size of content included in the second screen to conform to the size of a second area, which is separated from the first area, while the display is expanded by drawing out the display, wherein second screen is provided at a location opposite a detected user grip position.

16. The method of claim 15, wherein based on both hands being used, use a grip of the hand having a higher gripping.

17. The method of claim 15, further comprising:

generating at least one second screen comprising information related to the at least one event; and wherein the event comprises at least one of: phone notification, message reception, application-related notification reception, or user input.

18. The method of claim 17, further comprising:

detecting a user input indicating a display position for the at least one second screen after the display is expanded from the housing; and displaying the at least one second screen, based on the user input.

19. The method of claim 15, further comprising determining the position touched by the grip, based on a mainly used direction configured by the user and/or data sensed by one or more sensors.

20. The method of claim 15, further comprising:

displaying the second screen on an expanded display after the display is completely drawn out; and gradually displaying the second screen to conform to the size of the display area while the display is expanded by drawing out the display.

\* \* \* \* \*